US012077202B2

(12) United States Patent
Williams et al.

(10) Patent No.: US 12,077,202 B2
(45) Date of Patent: Sep. 3, 2024

(54) MOVEABLE STORAGE AND CARRYING DEVICE

(71) Applicant: Milwaukee Electric Tool Corporation, Brookfield, WI (US)

(72) Inventors: Aaron M. Williams, Milwaukee, WI (US); Evan Maverick James Quiros, Wauwatosa, WI (US); Aaron S. Blumenthal, Shorewood, WI (US); Ryan C. Dick, Sussex, WI (US); Matthew A. Lownik, Wauwatosa, WI (US); Matthew W. Naiva, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 360 days.

(21) Appl. No.: 17/532,598

(22) Filed: Nov. 22, 2021

(65) Prior Publication Data

US 2022/0144326 A1    May 12, 2022

Related U.S. Application Data

(63) Continuation of application No. PCT/US2021/058451, filed on Nov. 8, 2021.
(Continued)

(51) Int. Cl.
*B62B 3/02* (2006.01)
*B25H 3/00* (2006.01)
(Continued)

(52) U.S. Cl.
CPC ............... *B62B 3/04* (2013.01); *B25H 3/00* (2013.01); *B62B 3/02* (2013.01); *B62B 5/0433* (2013.01); *B62B 5/06* (2013.01)

(58) Field of Classification Search
CPC .... B62B 3/04; B62B 5/06; B62B 3/02; B62B 5/0433; B25H 3/00
See application file for complete search history.

(56) References Cited

U.S. PATENT DOCUMENTS 4,595,107 A    6/1986  Welsch
4,705,247 A    11/1987 Delmerico
(Continued)

FOREIGN PATENT DOCUMENTS

CN         207208121         4/2018
KR    10-2008-0022896        3/2008
(Continued)

OTHER PUBLICATIONS

US 8,273,008 B2, 09/2012, Quirico et al. (withdrawn)
(Continued)

*Primary Examiner* — Jason D Shanske
*Assistant Examiner* — James J Triggs
(74) *Attorney, Agent, or Firm* — Reinhart Boerner Van Deuren s.c.

(57) ABSTRACT

A mobile storage device that includes one or more coupling mechanisms. The mobile storage device includes one or more wheels coupled to one or more housings. The mobile storage device can be used on construction sites to help workers move and hold tools, equipment, and other material. The one or more coupling mechanisms are configured to engage with storage units, such as storage units within a modular system.

18 Claims, 35 Drawing Sheets

Related U.S. Application Data

(60) Provisional application No. 63/171,431, filed on Apr. 6, 2021, provisional application No. 63/130,047, filed on Dec. 23, 2020, provisional application No. 63/112,009, filed on Nov. 10, 2020.

(51) Int. Cl.
*B62B 3/04* (2006.01)
*B62B 5/04* (2006.01)
*B62B 5/06* (2006.01)

(56) References Cited

U.S. PATENT DOCUMENTS

| | | | |
|---|---|---|---|
| 4,763,799 A | 8/1988 | Cohn | |
| 4,790,610 A | 12/1988 | Welch et al. | |
| 4,998,023 A | 3/1991 | Kitts | |
| 5,011,240 A | 4/1991 | Kelley | |
| 5,016,948 A | 5/1991 | Welch et al. | |
| 5,308,012 A | 5/1994 | Fuller | |
| 5,566,961 A | 10/1996 | Snell | |
| 5,634,649 A | 6/1997 | Breining | |
| 5,765,842 A | 6/1998 | Phaneuf et al. | |
| 5,915,723 A | 6/1999 | Austin | |
| 5,971,512 A | 10/1999 | Swan | |
| 6,065,189 A | 5/2000 | Trine | |
| 6,270,094 B1 | 8/2001 | Campbell | |
| 6,497,423 B1 * | 12/2002 | Perelli | B62B 3/10 280/47.35 |
| 6,572,123 B2 | 6/2003 | Calmeise | |
| 6,739,605 B2 | 5/2004 | Calmeise et al. | |
| 6,758,482 B2 | 7/2004 | Stallbaumer | |
| 6,843,488 B1 | 1/2005 | Tseng | |
| 6,955,363 B2 * | 10/2005 | Libretti | A63H 33/30 280/47.38 |
| D515,767 S | 2/2006 | Arceta | |
| D517,768 S | 3/2006 | Arceta | |
| D518,267 S | 3/2006 | Arceta | |
| 7,014,200 B2 | 3/2006 | Calmeise et al. | |
| 7,111,852 B2 | 9/2006 | Woods | |
| 7,213,817 B2 | 5/2007 | Cheung | |
| 7,306,245 B1 | 12/2007 | Lowe | |
| 7,338,054 B2 | 3/2008 | Pint | |
| 7,398,978 B2 | 7/2008 | Cheung | |
| 7,594,668 B2 | 9/2009 | Arceta | |
| 7,806,426 B2 | 10/2010 | Van Landingham, Jr. et al. | |
| 7,815,215 B1 | 10/2010 | Lowe | |
| 7,862,534 B2 | 1/2011 | Quirico et al. | |
| 7,954,830 B2 | 6/2011 | Begin | |
| 8,070,181 B2 | 12/2011 | Forrest et al. | |
| 8,109,526 B2 | 2/2012 | Mason et al. | |
| 8,215,650 B2 | 7/2012 | Pearson et al. | |
| 8,282,111 B2 | 10/2012 | Hailston et al. | |
| 8,322,732 B2 | 12/2012 | Philpott et al. | |
| 8,333,160 B2 | 12/2012 | Lin | |
| 8,424,883 B1 | 4/2013 | Ramos | |
| 8,505,960 B1 | 8/2013 | Shindelar et al. | |
| 8,695,996 B2 | 4/2014 | Janick et al. | |
| 8,708,352 B2 | 4/2014 | Quirico et al. | |
| 8,720,913 B2 | 5/2014 | Fallon et al. | |
| 8,814,199 B2 | 8/2014 | Shindelar et al. | |
| 8,864,149 B2 | 10/2014 | Stryker | |
| 8,894,076 B2 | 11/2014 | Hailston et al. | |
| 8,944,444 B1 | 2/2015 | Tvrdy | |
| 8,967,632 B1 | 3/2015 | Gunsaullus | |
| 9,114,203 B2 | 8/2015 | Quirico et al. | |
| 9,123,449 B2 | 9/2015 | Quirico et al. | |
| 9,216,753 B2 | 12/2015 | Colbert et al. | |
| 9,242,664 B2 | 1/2016 | Arceta | |
| 9,254,856 B2 | 2/2016 | Oachs | |
| 9,266,547 B2 | 2/2016 | Schumaker | |
| 9,272,722 B2 | 3/2016 | Dufoure et al. | |
| 9,283,975 B2 | 3/2016 | McClanahan et al. | |
| 9,299,467 B2 | 3/2016 | Hidem et al. | |
| 9,299,468 B2 | 3/2016 | Hidem et al. | |
| 9,446,509 B2 | 9/2016 | Martin | |
| 9,452,768 B2 | 9/2016 | Fodrocy | |
| 9,457,828 B1 | 10/2016 | Guirlinger | |
| 9,493,177 B1 | 11/2016 | Chen | |
| 9,527,205 B1 | 12/2016 | Lin | |
| 9,597,053 B2 | 3/2017 | Hidem et al. | |
| 9,607,722 B2 | 3/2017 | Hidem et al. | |
| 9,616,562 B2 | 4/2017 | Hoppe et al. | |
| 9,623,887 B1 | 4/2017 | Brassard et al. | |
| 9,655,307 B2 | 5/2017 | Burmann | |
| 9,675,984 B1 | 6/2017 | Sotelo | |
| 9,717,844 B2 | 8/2017 | Quirico | |
| 9,750,869 B2 | 9/2017 | Hidem et al. | |
| 9,750,870 B2 | 9/2017 | Hidem et al. | |
| 9,751,549 B2 | 9/2017 | McClanahan et al. | |
| 9,814,826 B2 | 11/2017 | Hidem et al. | |
| 9,849,899 B1 | 12/2017 | Guirlinger | |
| 9,862,398 B1 | 1/2018 | Guirlinger | |
| 9,937,941 B2 | 4/2018 | Chen et al. | |
| 10,086,508 B2 | 10/2018 | Hoppe et al. | |
| 10,093,335 B2 | 10/2018 | Thuma et al. | |
| 10,118,632 B2 | 11/2018 | Carzola | |
| 10,239,546 B1 | 3/2019 | Scott | |
| D844,324 S | 4/2019 | Hoppe et al. | |
| 10,246,116 B2 | 4/2019 | Oltman et al. | |
| 10,335,537 B2 | 7/2019 | Hidem et al. | |
| 10,356,986 B2 | 7/2019 | Burmann | |
| 10,376,630 B2 | 8/2019 | Hidem et al. | |
| 10,391,625 B2 | 8/2019 | Gang et al. | |
| D862,026 S | 10/2019 | Carzola | |
| 10,427,702 B2 | 10/2019 | Phillips et al. | |
| 10,486,722 B2 | 11/2019 | Alves De Moraes et al. | |
| 10,501,104 B2 | 12/2019 | Simmons et al. | |
| 10,583,962 B2 | 3/2020 | Brunner et al. | |
| 10,703,534 B2 | 7/2020 | Brunner et al. | |
| 10,773,374 B2 | 9/2020 | Hoppe et al. | |
| RE48,237 E | 10/2020 | Fodrocy et al. | |
| D911,654 S | 2/2021 | Yu et al. | |
| D911,657 S | 2/2021 | Yu et al. | |
| 10,913,474 B1 | 2/2021 | Chiao et al. | |
| 2002/0030337 A1 | 3/2002 | Calmeise et al. | |
| 2002/0130598 A1 | 9/2002 | Schmidt | |
| 2004/0227315 A1 | 11/2004 | Van Landingham, Jr. | |
| 2004/0262867 A1 | 12/2004 | Arceta et al. | |
| 2005/0011037 A1 | 1/2005 | Zhao et al. | |
| 2005/0023786 A1 | 2/2005 | Delmerico | |
| 2005/0248109 A1 | 11/2005 | Chang | |
| 2006/0232032 A1 | 10/2006 | Goldberg | |
| 2008/0000171 A1 | 1/2008 | McKay et al. | |
| 2008/0084036 A1 | 4/2008 | Keeler | |
| 2008/0302585 A1 | 12/2008 | Perelli et al. | |
| 2009/0189498 A1 | 7/2009 | Catron et al. | |
| 2009/0230644 A1 | 9/2009 | Stanley | |
| 2009/0319079 A1 | 12/2009 | Arceta et al. | |
| 2010/0066045 A1 | 3/2010 | Presnell et al. | |
| 2010/0283227 A1 | 11/2010 | Perelli et al. | |
| 2012/0274196 A1 | 11/2012 | Arceta et al. | |
| 2012/0310031 A1 | 12/2012 | Quirico et al. | |
| 2013/0033014 A1 | 2/2013 | Yang | |
| 2013/0307238 A1 | 11/2013 | Campbell et al. | |
| 2014/0084187 A1 | 3/2014 | Quirico et al. | |
| 2014/0343418 A1 | 11/2014 | Quirico et al. | |
| 2015/0097348 A1 | 4/2015 | Steinfels et al. | |
| 2015/0225006 A1 | 8/2015 | Thiel | |
| 2016/0009306 A1 | 1/2016 | Garcia | |
| 2016/0287900 A1 | 10/2016 | Quirico et al. | |
| 2016/0325042 A1 | 11/2016 | Hidem et al. | |
| 2017/0166352 A1 | 6/2017 | Hoppe et al. | |
| 2018/0093035 A1 | 4/2018 | Hidem et al. | |
| 2018/0111635 A1 | 4/2018 | Oltman et al. | |
| 2018/0161975 A1 | 6/2018 | Brunner | |
| 2018/0194381 A1 | 7/2018 | Josephsen | |
| 2018/0301233 A1 | 10/2018 | Quirico et al. | |
| 2019/0023298 A1 | 1/2019 | Carzola | |
| 2019/0039637 A1 | 2/2019 | Thuma et al. | |
| 2019/0084602 A1 | 3/2019 | Ribbe et al. | |
| 2019/0111956 A1 | 4/2019 | Phillips et al. | |
| 2019/0225371 A1 | 7/2019 | Hoppe et al. | |
| 2019/0307949 A1 | 10/2019 | Hidem et al. | |

(56) References Cited

U.S. PATENT DOCUMENTS

| | | |
|---|---|---|
| 2020/0039553 A1 | 2/2020 | Abohammdan et al. |
| 2020/0147781 A1 | 5/2020 | Squiers et al. |
| 2020/0165036 A1 | 5/2020 | Squiers et al. |
| 2020/0223585 A1 | 7/2020 | Brunner et al. |
| 2020/0299027 A1 | 9/2020 | Brunner et al. |
| 2020/0346677 A1 | 11/2020 | Yu et al. |
| 2020/0401133 A1 | 12/2020 | Armbrust et al. |
| 2020/0406446 A1 | 12/2020 | Hoppe et al. |
| 2021/0016928 A1 | 1/2021 | Brunner et al. |
| 2021/0031975 A1 | 2/2021 | Brunner et al. |
| 2023/0122425 A1 | 4/2023 | Camp et al. |

FOREIGN PATENT DOCUMENTS

| | | |
|---|---|---|
| WO | WO0144035 | 6/2001 |
| WO | WO2005016071 | 2/2005 |
| WO | WO19228647 | 12/2019 |

OTHER PUBLICATIONS

International Search Report and Written Opinion for International Application No. PCT/US2021/058451, dated Feb. 24, 2022, 11 pages.

\* cited by examiner

MOVEABLE STORAGE AND CARRYING DEVICE

CROSS-REFERENCE TO RELATED PATENT APPLICATIONS

The present application is a continuation of International Application No. PCT/US2021/058451, filed Nov. 8, 2021, which claims the benefit of and priority to U.S. Provisional Application No. 63/171,431, filed on Apr. 6, 2021, U.S. Provisional Application No. 63/112,009, filed on Nov. 10, 2020, and U.S. Provisional Application No. 63/130,047, filed on Dec. 23, 2020, each of which are incorporated herein by reference in their entireties.

BACKGROUND OF THE INVENTION

The present disclosure is directed generally to devices for holding, storing and moving tools and equipment. The present disclosure relates specifically to a mobile device that includes one or more components to facilitate carrying tools and equipment around a jobsite.

A modular storage system can include different units, devices and/or containers that provide varying functions. One such device is a mobile storage device that couples with one or more elements in the modular storage system, such as tool storage units.

SUMMARY OF THE INVENTION

One embodiment of the invention relates to a mobile tool support device configured to move and support tools and equipment on a worksite. The mobile tool support device includes a lower housing, a plurality of wheels coupled to the lower housing, a plurality of legs extending upward from the lower housing, an upper housing coupled to the plurality of legs above the lower housing, a handle and a coupling interface. The handle is coupled to the upper housing and is configured to facilitate a user moving the mobile tool support device. The coupling interface is coupled to a periphery of the upper housing. The coupling interface includes a first rib and a second rib extending along opposing sides of the coupling interface. The first rib and the second rib are offset from the upper housing. The coupling interface is configured to couple with a second coupling interface. The coupling interface is configured to detachably engage with a tool storage modular unit such that the tool storage modular unit is supported by the upper housing.

Another embodiment of the invention relates to a mobile tool support device configured to move and support tools and equipment on a worksite. The mobile tool support device includes a lower housing, a plurality of wheels coupled the lower housing, a plurality of legs extending upward from the lower housing, an upper housing coupled to the plurality of legs, a handle coupled to the upper housing, the handle configured to facilitate a user moving the mobile tool support device, and a first coupling element coupled to a first leg of the plurality of legs. The first coupling element is configured to receive an elongate support structure. The first coupling element includes a lower wall, a rear wall extending upward from the lower wall away from the lower housing, a primary channel, an aperture, and an angled channel. The primary channel extends through the first coupling element along a first axis. The primary channel is aligned with at least a portion of the rear wall thereby preventing the elongate support structure from extending past the rear wall when transiting the primary channel along the first axis. The aperture is within the rear wall. The angled channel extends through the first coupling element along a second axis. The second axis defines an angle of at least 30 degrees with respect to the first axis. The angled channel is aligned with the aperture thereby permitting the elongate support structure to extend past the rear wall when transiting the angled channel along the second axis. The aperture is in fluid communication with the primary channel via the angled channel.

Another embodiment of the invention relates to a mobile tool support device configured to move and support tools and equipment on a worksite. The mobile tool support device includes a lower housing, a plurality of wheel housings coupled the lower housing, a first support leg coupled to the lower housing and extending upward from the lower housing, a second support leg coupled to the lower housing and extending upward from the lower housing, an upper housing coupled to the first support leg and the second support leg, a handle coupled to the upper housing, the handle configured to facilitate a user moving the mobile tool support device, a first aperture defined by the first support leg, and a second aperture defined by the second support leg. The first aperture defines an upper end, a lower end, and side walls extending between the upper end and the lower end. The first aperture defines a first maximum width at a transition from the upper end to the side walls. The first aperture defines a first minimum width at a transition from the lower end to the side walls. The first aperture defines a width that varies at a first rate from the first maximum width to the first minimum width. The second aperture is aligned with the first aperture such that the first aperture and the second aperture are configured to contemporaneously receive an elongate support structure extending between the first aperture and the second aperture. The second aperture defines an upper end, a lower end, and side walls extending between the upper end and the lower end. The second aperture defines a second maximum width at a transition from the upper end to the side walls. The second aperture defines a second minimum width at a transition from the lower end to the side walls. The second aperture defines a width that varies at a second rate from the second maximum width to the second minimum width, wherein the second rate is less than first rate.

Another embodiment of the invention relates to a mobile device for carrying tools and equipment. The mobile device includes a lower housing, one or more wheels pivotally coupled to a first end of the lower housing (e.g., the wheels swivel with respect to the lower housing), one or more wheels coupled to a second end of the lower housing opposite the first end, two or more walls extending vertically upward from the lower housing, an upper housing coupled to the two walls.

In a specific embodiment, each of the two or more walls extending vertically includes a curved slot, such as a J-shaped slot. In a specific embodiment, the mobile device includes a kickstand that actuates between a locked position and an unlocked position, and wheels proximate the kickstand are biased to remain stationary when the kickstand is in the locked position. In a specific embodiment, a periphery of the upper housing includes one or more coupling interfaces that couple the upper housing to a modular storage unit, component, and/or storage device.

Another embodiment of the invention relates to a mobile storage device including a lower housing, a first wheel housing pivotally coupled to a first end of the lower housing, a second wheel housing fixedly coupled to a second end of the lower housing opposite the first end, a leg extending vertically upward from the lower housing, and an upper housing coupled to the leg.

In a specific embodiment, the leg includes a recess that extends inwardly from an outer surface of the leg. In a specific embodiment, the recess includes an upper portion that extends inwardly in a first direction from the outer surface of the leg, the recess including a holding area extending downwardly from the upper portion, the holding area configured to receive an axle and permit the axle to rotate within the holding area. In a specific embodiment, the leg includes a projection that extends in the first direction into the recess above the holding area.

In a specific embodiment, the mobile storage device includes a kickstand that actuates between a locked position and an unlocked position. The kickstand interfaces with a floor the mobile device is positioned on when the kickstand is in the locked position.

In a specific embodiment, the mobile storage device includes a coupling interface coupled to a periphery of the upper housing. The coupling interface is configured to detacheably engage with a modular storage unit, component, and/or storage device.

Another embodiment of the invention relates to a mobile device including a lower housing, a plurality of wheels coupled to the lower housing, a plurality of legs extending upward from the lower housing, an upper housing coupled to the plurality of legs, and a first coupling element. The first coupling element is coupled to a first leg of the plurality of legs and configured to receive a cylinder. The first coupling element includes a lower wall, a rear wall extending upward from the lower wall away from the lower housing, a primary channel, an aperture in the rear wall, and an angled channel. The primary channel extends through the first coupling element. The angled channel extends through the first coupling element and through the primary channel at an angle relative to the primary channel. The angled channel is aligned with the aperture such that the aperture is in fluid communication with the primary channel via the angled channel.

In a specific embodiment, the primary channel includes a rear portion closest to the rear wall, a front portion furthest from the rear wall, and a middle portion between the rear portion and the front portion. The angled channel includes a rear portion closest to the rear wall, a front portion furthest from the rear wall, and a middle portion between the rear portion and the front portion. In a specific embodiment, the middle portion of the angled channel is coextensive with the middle portion of the primary channel.

In a specific embodiment, the primary channel includes a rear portion closest to the rear wall, a front portion furthest from the rear wall, and a middle portion between the rear portion and the front portion. The angled channel includes a rear portion closest to the rear wall, a front portion furthest from the rear wall, and a middle portion between the rear portion and the front portion. The front portion of the angled channel is offset from the front portion of the primary channel in a first direction, and the back portion of the angled channel is offset from the back portion of the primary channel in a second direction opposite the first direction.

In a specific embodiment, the mobile device includes a second coupling element coupled to a leg and configured to receive the cylinder. The second coupling element includes a lower wall, a rear wall extending upward from the lower wall away from the lower housing, a primary channel extending horizontally through the first coupling element, and a biasing element. The biasing element biases against a cylinder moving from an upper portion of the primary channel to a lower portion of the primary channel.

Another embodiment of the invention relates to a mobile storage device including a lower housing, a first support leg and second support leg coupled to the lower housing and extending upward from the lower housing, and an upper housing coupled to a top of the first and second support legs. A first aperture is defined by the first support leg. The first aperture has a width that varies at a first rate from a maximum width to a minimum width that is lower than the maximum width. The second aperture is defined by the second support leg. The second aperture is aligned with the first aperture such that the first aperture and the second aperture are configured to contemporaneously receive an elongate tool. The second aperture has a width that varies at a second rate from a maximum width to a minimum width that is lower than the first height. The second rate is less than first rate.

In a specific embodiment, the first aperture defines a first height of the bottom-most portion of the first aperture with respect to the lower housing, and the second aperture defines a second height of the bottom-most portion of the second aperture with respect to the lower housing that is the same as the first elevation.

In a specific embodiment, the first rate and the second rate are each the change in width with respect to the change in height, and a ratio of the first rate to the second rate is between 2.5:1 and 1.1:1.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
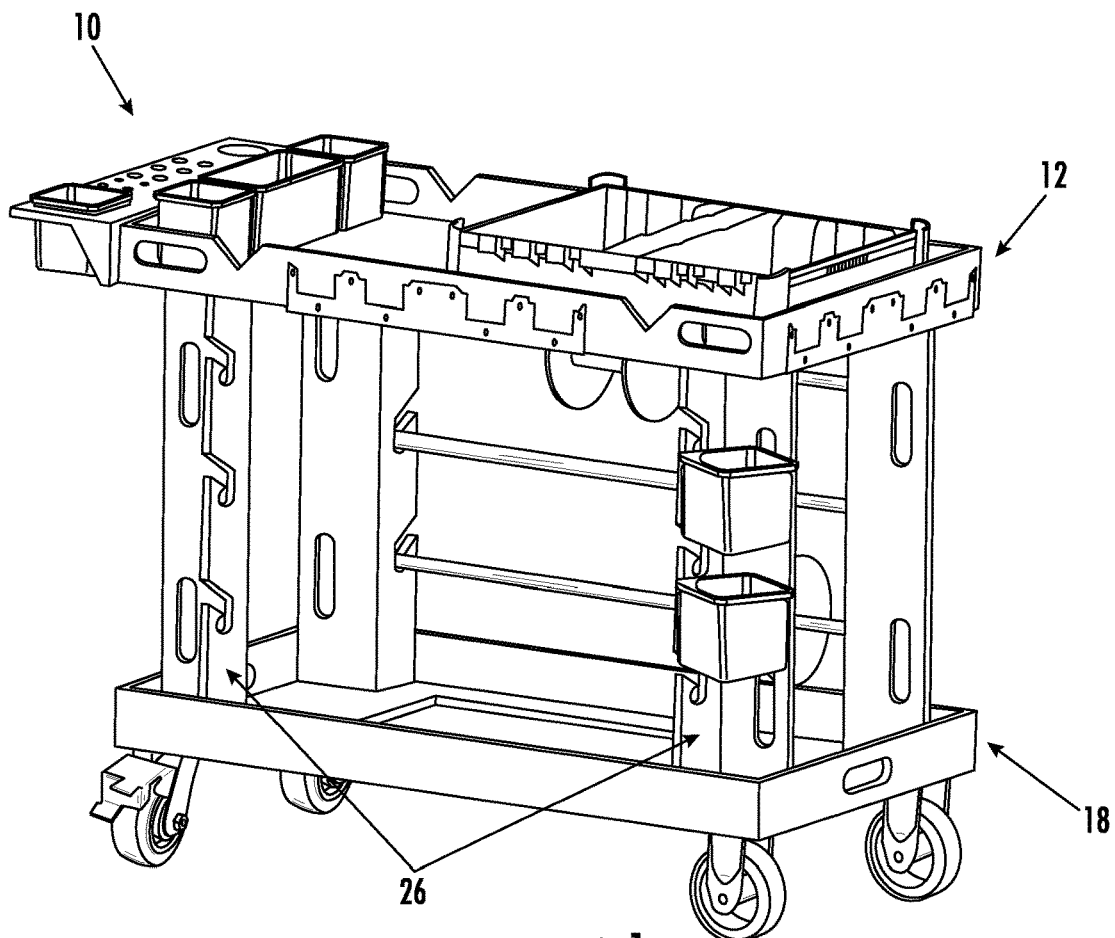
FIG. 1 is a perspective view of a mobile storage device, according to an exemplary embodiment.

Referring generally to the figures, various embodiments of a mobile unit, storage device and/or structure are shown. Mobile devices are used on construction sites to help workers move and hold tools and equipment. The present application provides a mobile device, such as a mobile work cart, with a plurality of coupling mechanisms to facilitate carrying and coupling to various tools and equipment that may be used.

Referring to FIGS. 1-5, a container, unit, device and/or a mobile tool support device, shown as a mobile work cart 10, is shown according to an exemplary embodiment. Mobile work cart 10 is configured to move and support tools and equipment on a worksite. Mobile work cart 10 includes an upper portion, shown as upper housing 12, a lower portion, shown as lower housing 18, and vertical connecting portions, shown as one or more legs 26, extending from lower housing 18 to upper housing 12 such that the upper housing 12 is above the lower housing 18. In a specific embodiment the legs 26 are arranged at and coupled to four corners of the upper housing 12 and the lower housing 18.

One or more wheels 28 are coupled to lower housing 18. In various embodiments a plurality of wheels are coupled to lower housing 18. In a specific embodiment, two wheels 28 are rotateably coupled to pivotable wheel housing 30 that is pivotally coupled to first end 22 of lower housing 18, and two wheels are rotateably coupled to wheel housing 34 that is fixedly coupled to opposing second end 24 of lower housing 18. Pivotable wheel housings 30 swivel with respect to lower housing 18, thereby allowing mobile work cart 10 to be moved around more easily. Pivotable wheel housings 30 are permitted to change positions with respect to the lower housing 18 so that the axis of rotation for wheels 28 can be adjusted relative to the lower housing 18, such as if the mobile work cart 10 is being turned. Wheel housings 34 are fixedly coupled to the lower housing 18 such that the axis of rotation for the wheels 28 remains perpendicular with respect to the length of the mobile work cart 10 and parallel to the width of mobile work cart 10.

Figure 2:
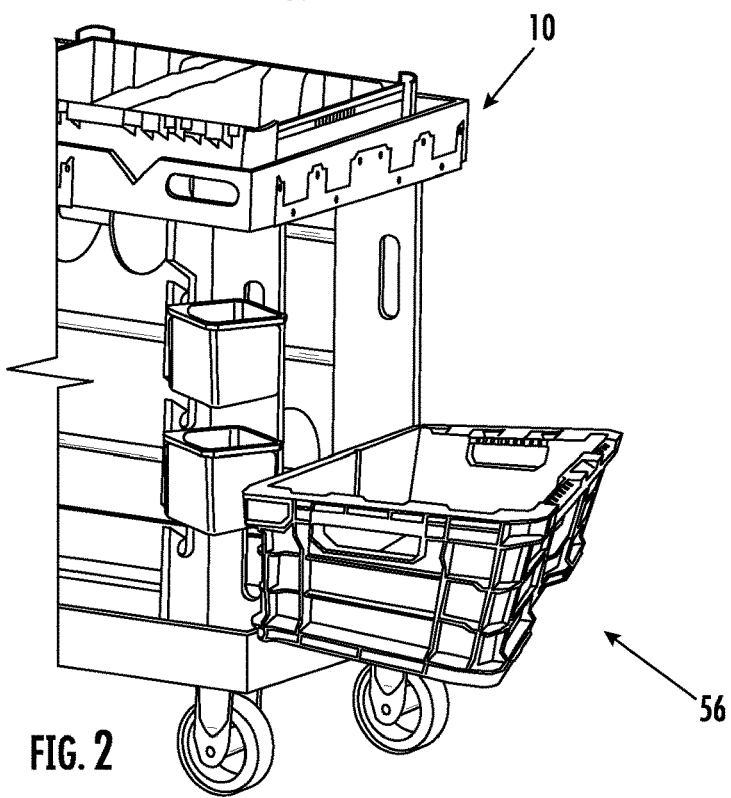
FIG. 2 is a perspective view of a portion of the mobile storage device of FIG. 1, according to an exemplary embodiment.
Figure 3:
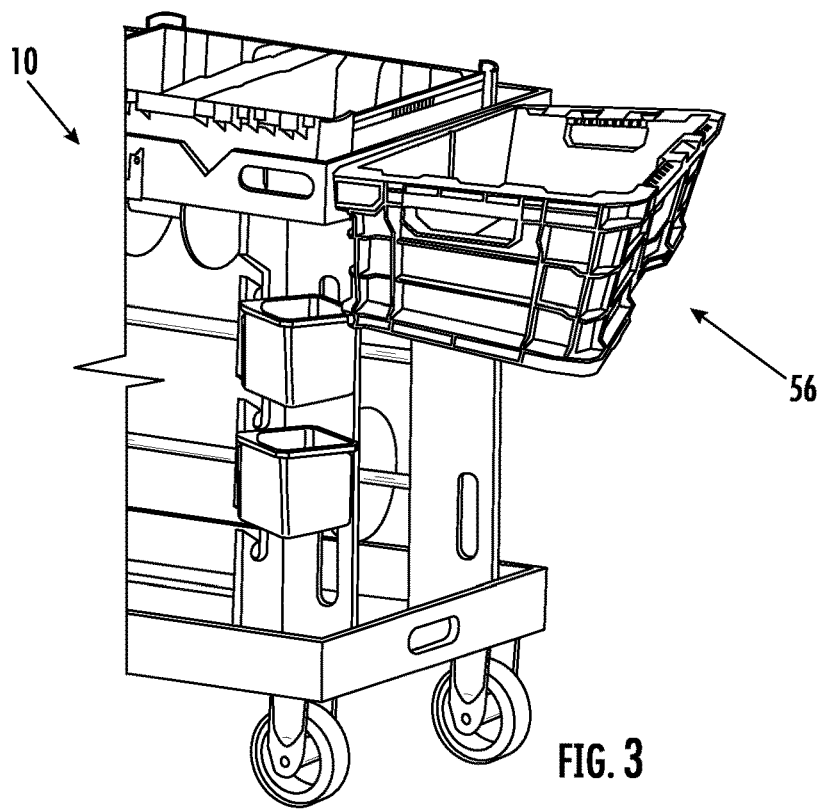
FIG. 3 is a perspective view of a portion of the mobile storage device of FIG. 1, according to an exemplary embodiment.
Figure 4:
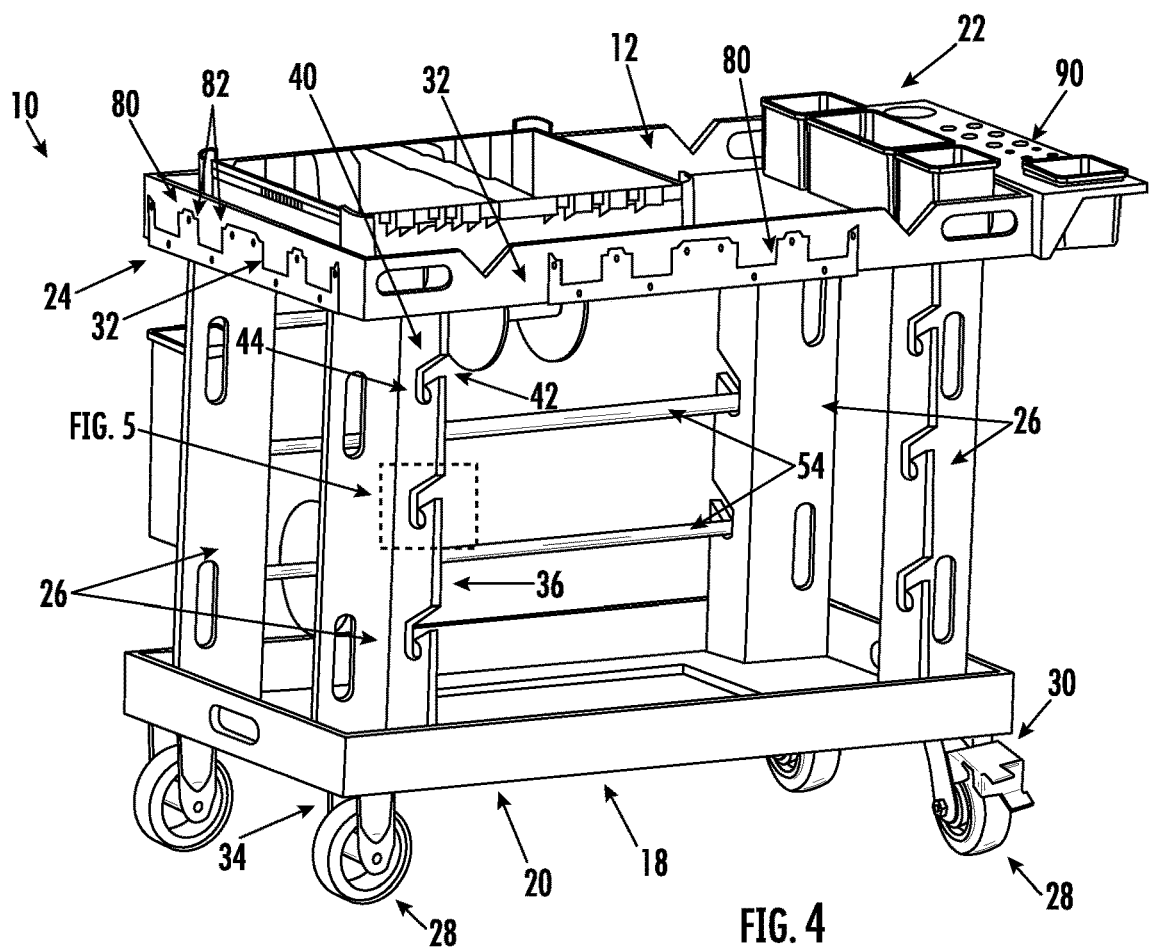
FIG. 4 is a perspective view of the mobile storage device of FIG. 1, according to an exemplary embodiment.

Mobile work cart 10 includes one or more mounting locations, shown as coupling interface 80, along a rim of the shelf (e.g., the upper housing 12) that couple to modular storage devices 56 (FIGS. 2-3). In various embodiments, one or more coupling interfaces 80 are positioned around periphery 32 of upper housing 12. In a specific embodiment, the mounting locations are compatible with the coupling mechanisms described in International Patent Application No. PCT/US2018/044629, which is incorporated herein by reference in its entirety.

In various embodiments the one or more coupling interface 80 include a first rib 82 and a second rib 82 extending along opposing sides of the coupling interface 80, the first rib 82 and the second rib 82 offset from the upper housing 12, and the coupling interface 80 is configured to couple with a second coupling interface (see e.g., coupler 321 in FIG. 20) comprising two tongues that extend from the second coupling interface in opposing directions, such as via the two ribs of coupling interface 80 detachably engaging with the two tongues of the second coupling interface. It is contemplated herein that boxes, hooks, pouches, batteries, accessories, etc., can be coupled to the mounting locations. In various embodiments, the coupling interface 80 is configured to detachably engage with a tool storage modular unit such that the tool storage modular unit is supported by the upper housing 12.

Handle 90 is coupled to mobile work cart 10, such as detachably coupled to mobile work cart 10, such as via coupling interface 80. In various embodiments handle 90 is configured to facilitate a user moving the mobile work cart 10. In a specific embodiment, the handle 90 is removably coupleable to a first end 22 of the upper housing 12 (e.g., the "rear") and/or to a second end 24 of the upper housing 12 opposite the first end 22 (e.g., the "front") to allow the user to place the handle 90 so that either the front or rear wheels swivel as the user is pushing the mobile work cart 10 around a jobsite.

In a specific embodiment, the legs 26 include one or more recessed portions, such as recesses, shown as slots 40. In a specific embodiment, slots 40 form a J-shape. In use, slots 40 receive axle 54. Rolls of objects, such as rolls of wire, are hung around the axle 54. The rolls are permitted to rotate around the axle 54 and axle 54 is permitted to rotate within slots 40, thereby allowing the wire to be easily removed from the rolls.

Figure 5:
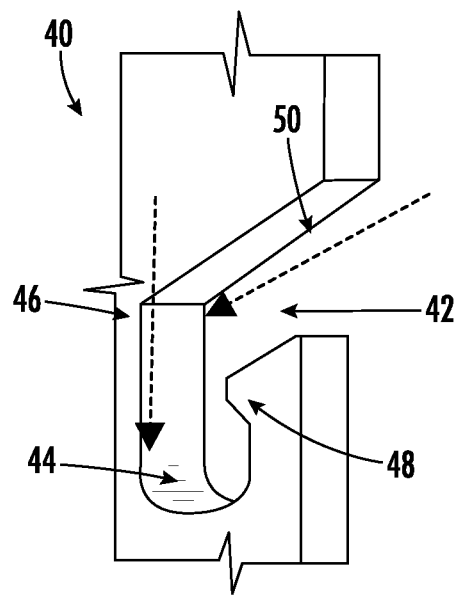
FIG. 5 is a detailed perspective view of a portion of the mobile storage device of FIG. 1, according to an exemplary embodiment.
Figure 6:
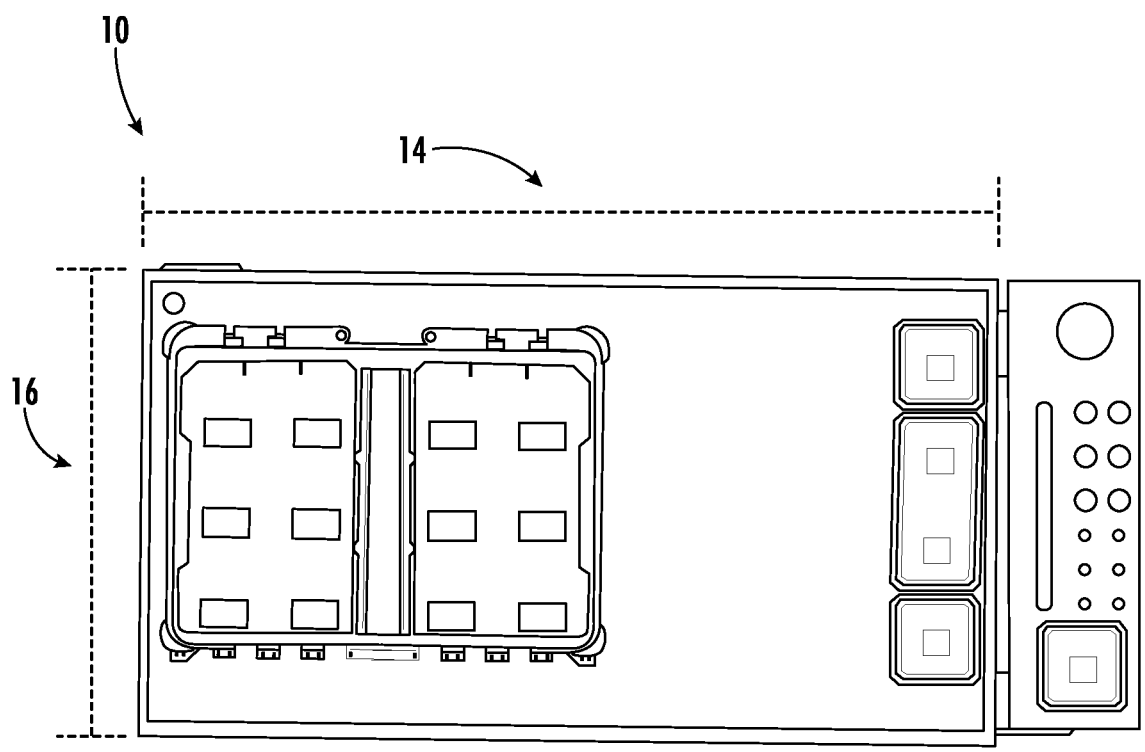
FIG. 6 is a top view of the mobile storage device of FIG. 1, according to an exemplary embodiment.
Figure 7:
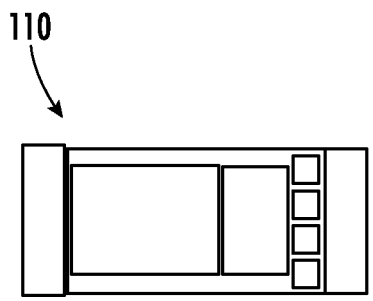
FIG. 7 is a schematic top view of the mobile storage device of FIG. 1, according to exemplary embodiments.
Figure 8:
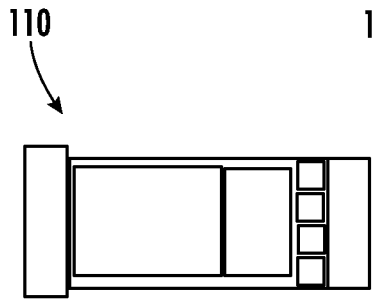
FIG. 8 is a schematic top view of a mobile storage device, according to exemplary embodiments.
Figure 9:
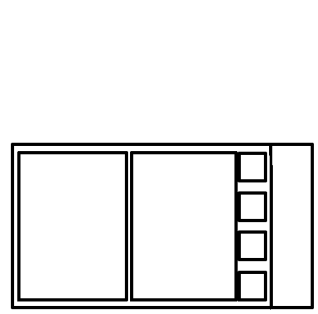
FIG. 9 is a schematic top view of a mobile storage device, according to exemplary embodiments.

Referring to FIG. 5, slots 40 include an upper portion 42 that extends inwardly from outer surface 36 of legs 26. The slots 40 are configured to receive an axle and permit the axle to rotate. Holding area 44 extends in a downward direction 46 from upper portion 42 and is configured to receive axle 54 and permit the axle to rotate within the holding area 44. In a specific embodiment, projection 48 extends into slot 40 above holding area 44 in direction 50 into slot 40 above holding area 44, thereby helping secure axle 54 within holding area 44. In a specific embodiment, upper portion 42 extends in a first direction 50 inwardly from outer surface 36 of leg 26 and in a downward direction 46 towards lower housing 18.

Referring to FIGS. 6-10, various aspects of mobile work cart 10, mobile work cart 110, mobile work cart 120, and mobile work cart 130 are shown. Mobile work cart 110 is similar to mobile work cart 10 with the exception of the differences described. In various embodiments, mobile work cart 110 has a length of 44" and a width of 21". Mobile work cart 120 is similar to mobile work cart 10 and mobile work cart 110 with the exception of the differences described. In various embodiments, mobile work cart 120 has a length of 44" and a width of 19". Mobile work cart 130 is similar to mobile work cart 10, mobile work cart 110 and mobile work cart 120 with the exception of the differences described. In various embodiments, mobile work cart 130 has a length of 44" and a width of 24". In various embodiments, the mobile work cart described herein have a width between 17.38" and 19.5" or a width between 25" and 26.5".

Figure 10:
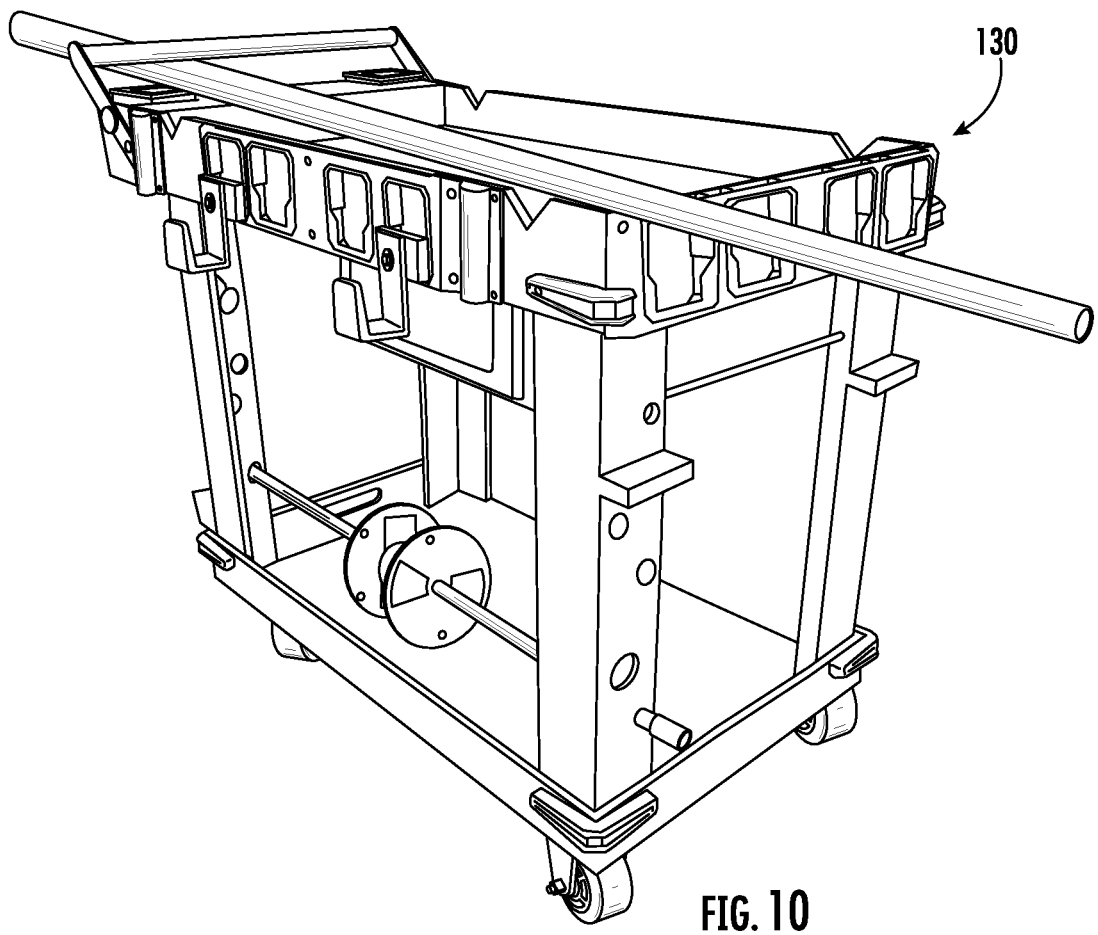
FIG. 10 is a perspective view of a mobile storage device, according to an exemplary embodiment.
Figure 11:
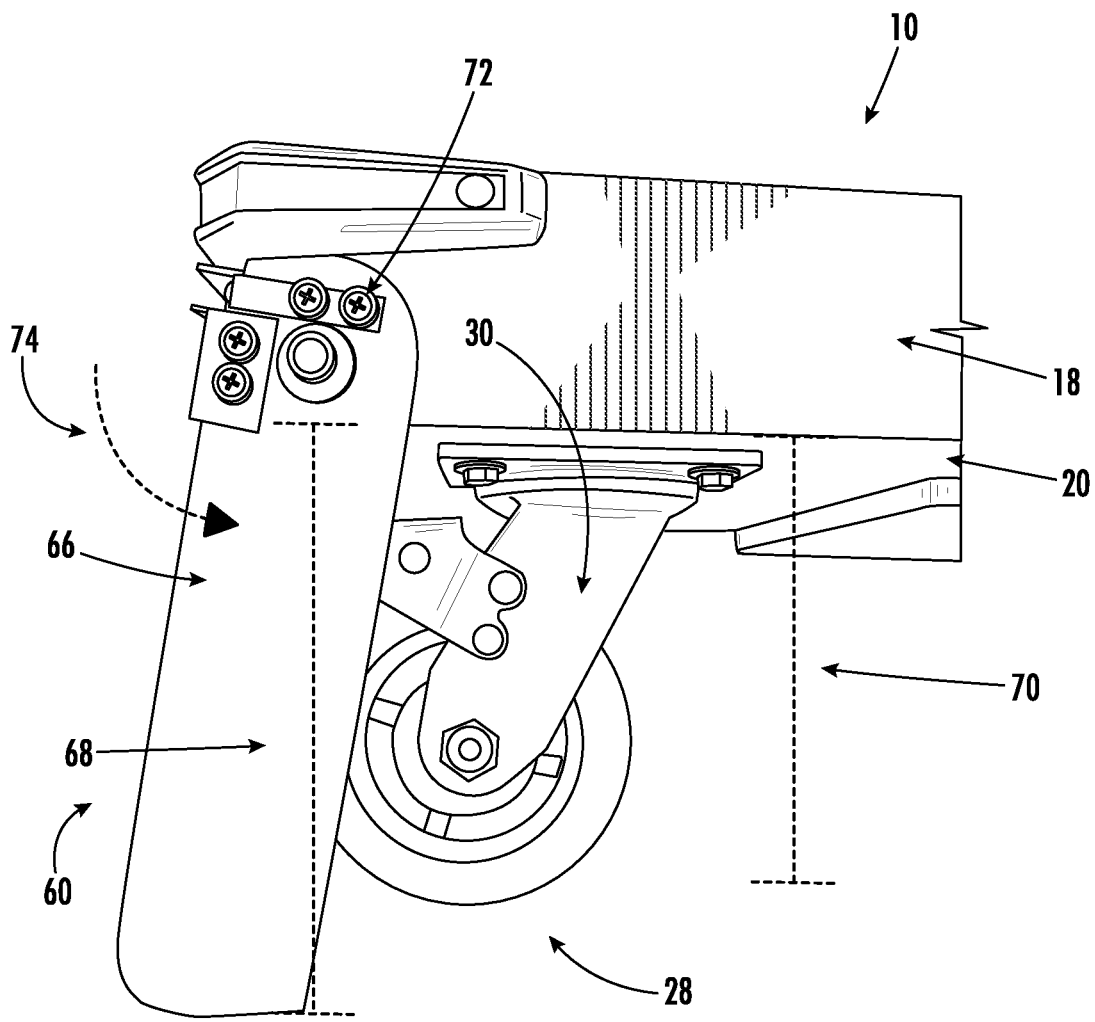
FIG. 11 is a perspective view of the mobile device of FIG. 1, according to an exemplary embodiment.
Figure 12:
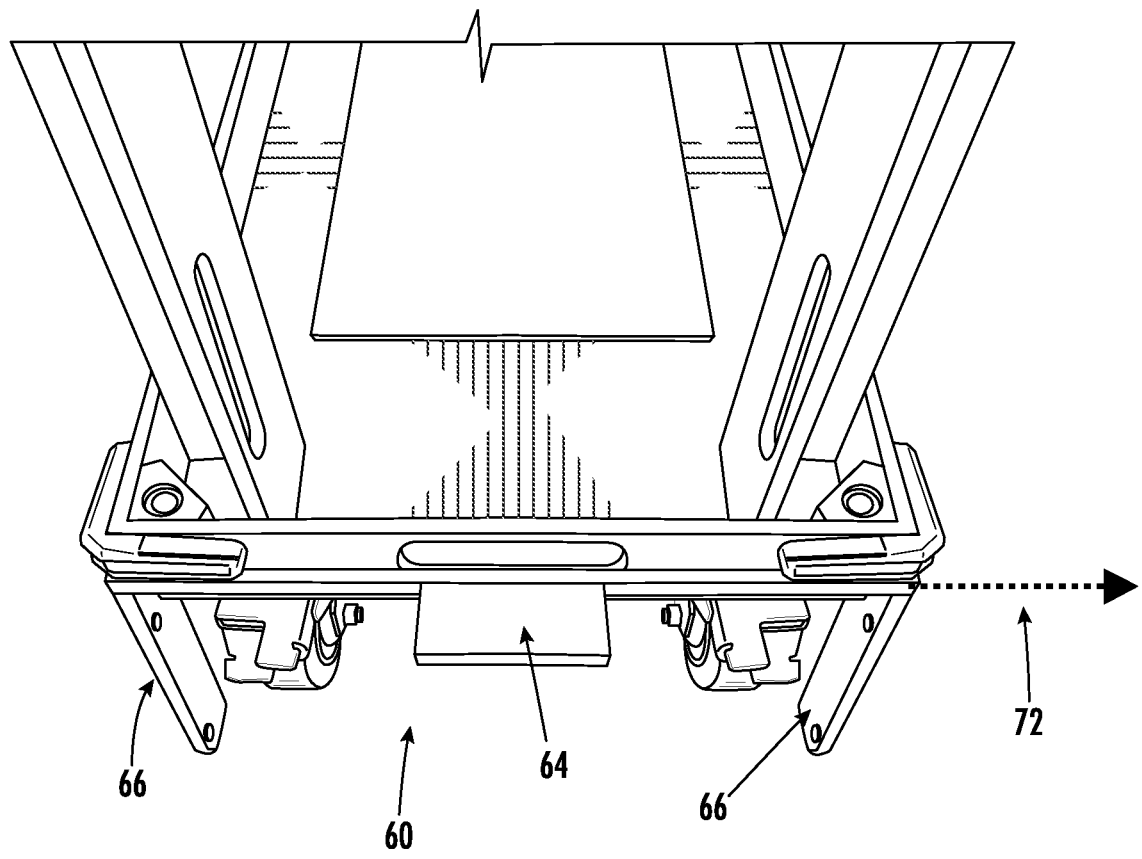
FIG. 12 is a perspective view of the mobile device of FIG. 1, according to an exemplary embodiment.

In a specific embodiment, mobile work cart 10 has a width 16 of 21" and a length 14 of 56". In a specific embodiment, mobile work cart 110 has a width of 19" and a length of 44". In a specific embodiment, mobile work cart 210 has a width of 24" and a length of 44". In an alternate embodiment, a mobile storage device has a similar arrangement to mobile s work cart 210 except that each of the storage devices are arranged parallel with the length of the mobile storage device rather than perpendicular to the length of the mobile storage device, so the mobile storage device is longer than mobile work cart 210. In a specific embodiment, lower housing of mobile work cart 130 extends past a front surface of the upper housing (FIG. 10).

Referring to FIGS. 11-19, mobile work cart 10 includes a locking device, shown as a kickstand 60. The kickstand 60 actuates between a locked and an unlocked position. In the locked position, kickstand 60 interfaces with a floor the mobile work cart 10 is positioned on, thereby biasing mobile work cart 10 to remain stationary. For example, this stationary positioning of the mobile storage device may be useful when wire is being pulled from a roll. Wheels 28 extend distance 70 from lower surface 20 of lower housing 18 that is less than distance 68 that projection 66 extends from lower surface 20 of lower housing 18. As a result of projection 66 extending further from lower surface 20 than wheels 28, when kickstand 60 is in the locked position wheels 28 no longer interface with the floor.

Kickstand 60 includes a body 62 that extends laterally along the body of lower housing 18. Two projections 66 are coupled to opposing ends of body 62, and an interfacing portion, shown as projection 64, is coupled to a central portion of body 62.

Figure 13:
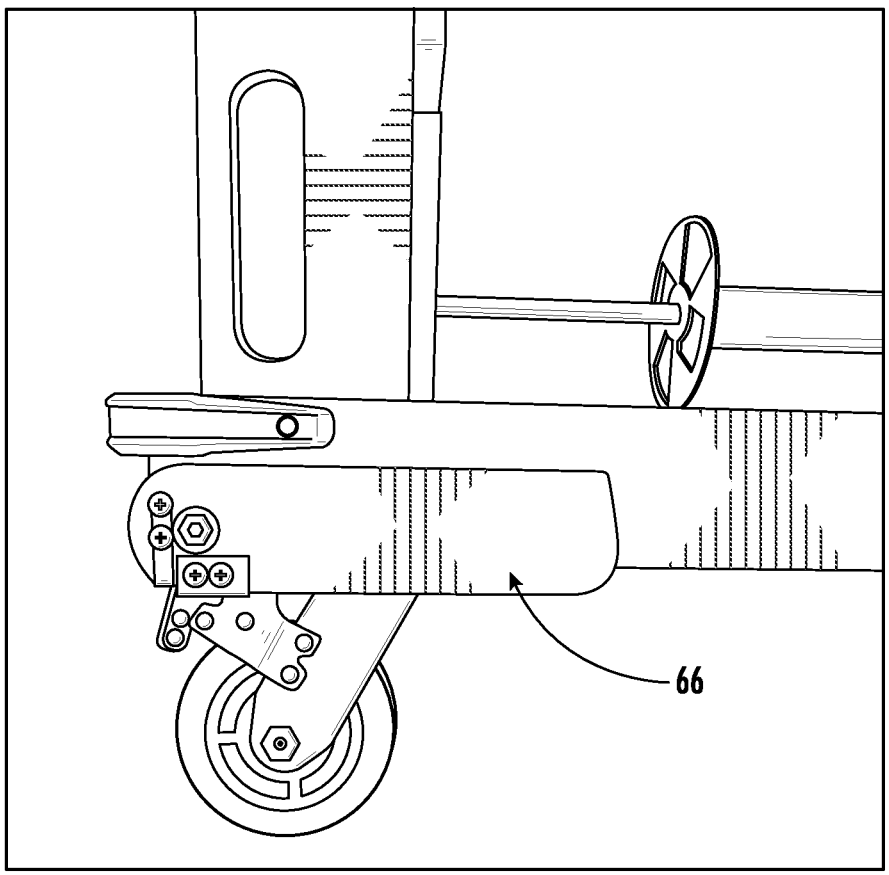
FIG. 13 is a perspective view of the mobile device of FIG. 1, according to an exemplary embodiment.
Figure 14:
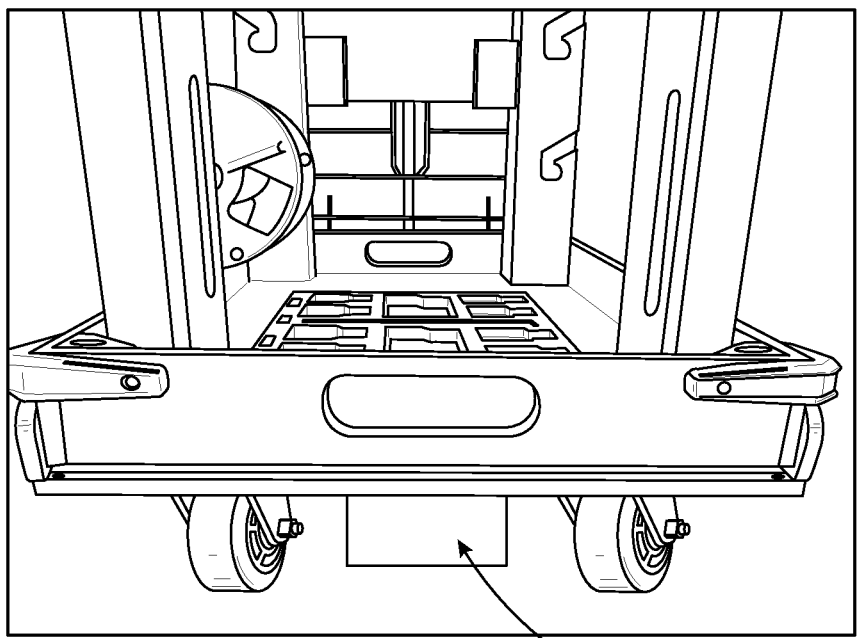
FIG. 14 is a perspective view of the mobile device of FIG. 1, according to an exemplary embodiment.

Kickstand 60 rotates around axis 72 with respect to lower housing 18. Kickstand 60 is rotated in direction 74 to actuate from the locked position (FIGS. 11-12) to the unlocked position (FIGS. 13-14).

Figure 15:
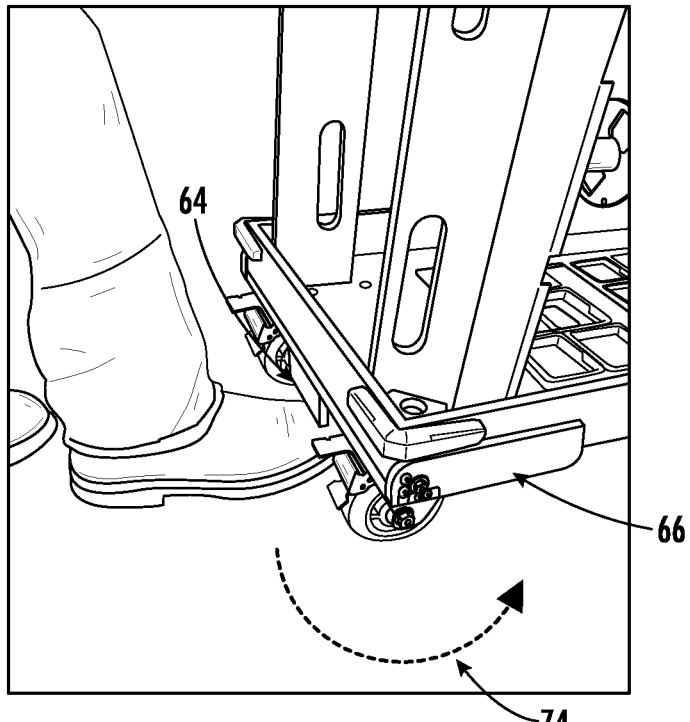
FIG. 15 is a perspective view of the mobile device of FIG. 1, according to an exemplary embodiment.
Figure 16:
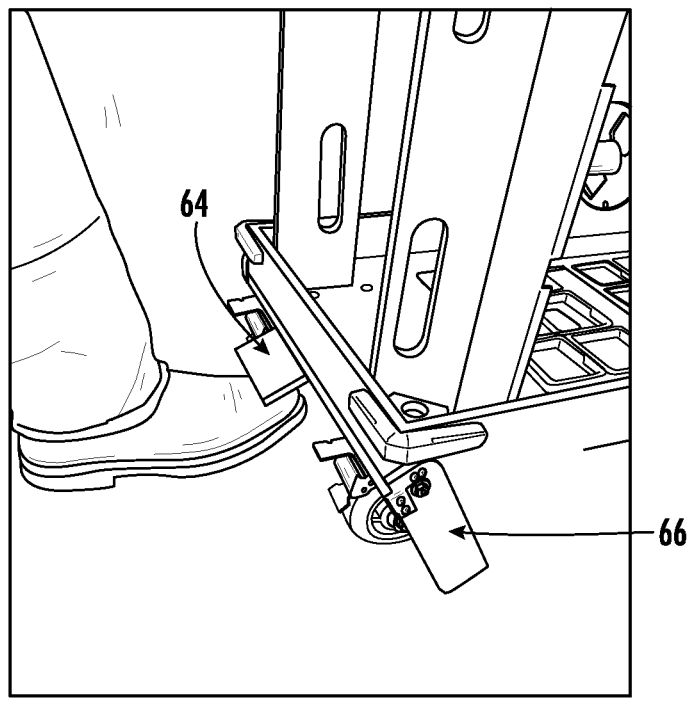
FIG. 16 is a perspective view of the mobile device of FIG. 1, according to an exemplary embodiment.
Figure 17:
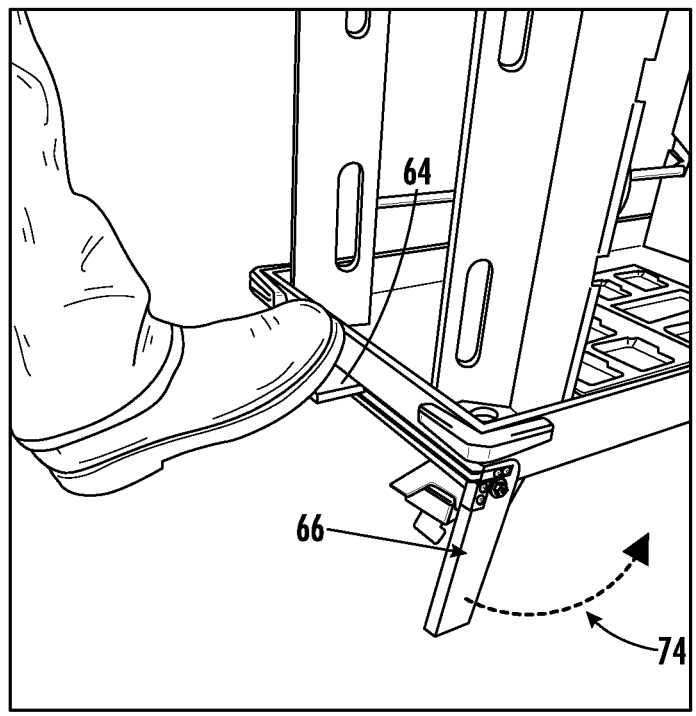
FIG. 17 is a perspective view of the mobile device of FIG. 1, according to an exemplary embodiment.
Figure 18:
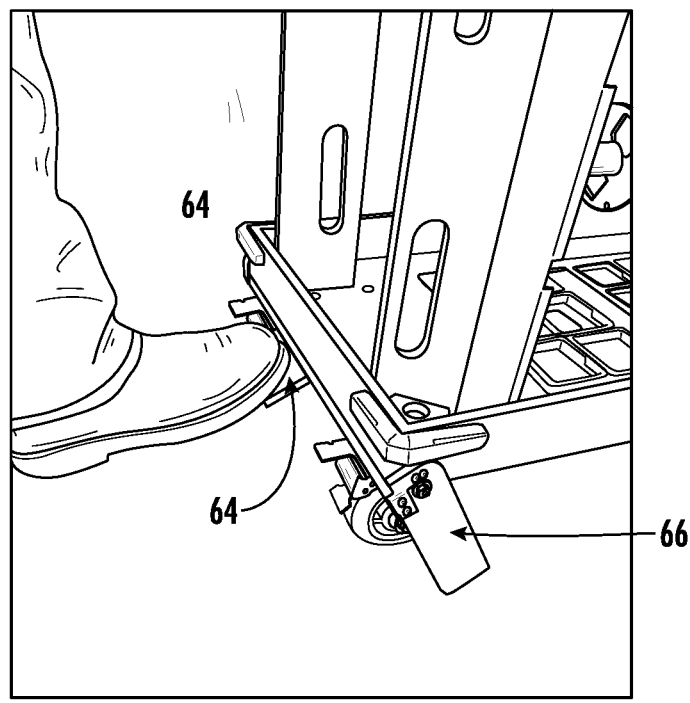
FIG. 18 is a perspective view of the mobile device of FIG. 1, according to an exemplary embodiment.
Figure 19:
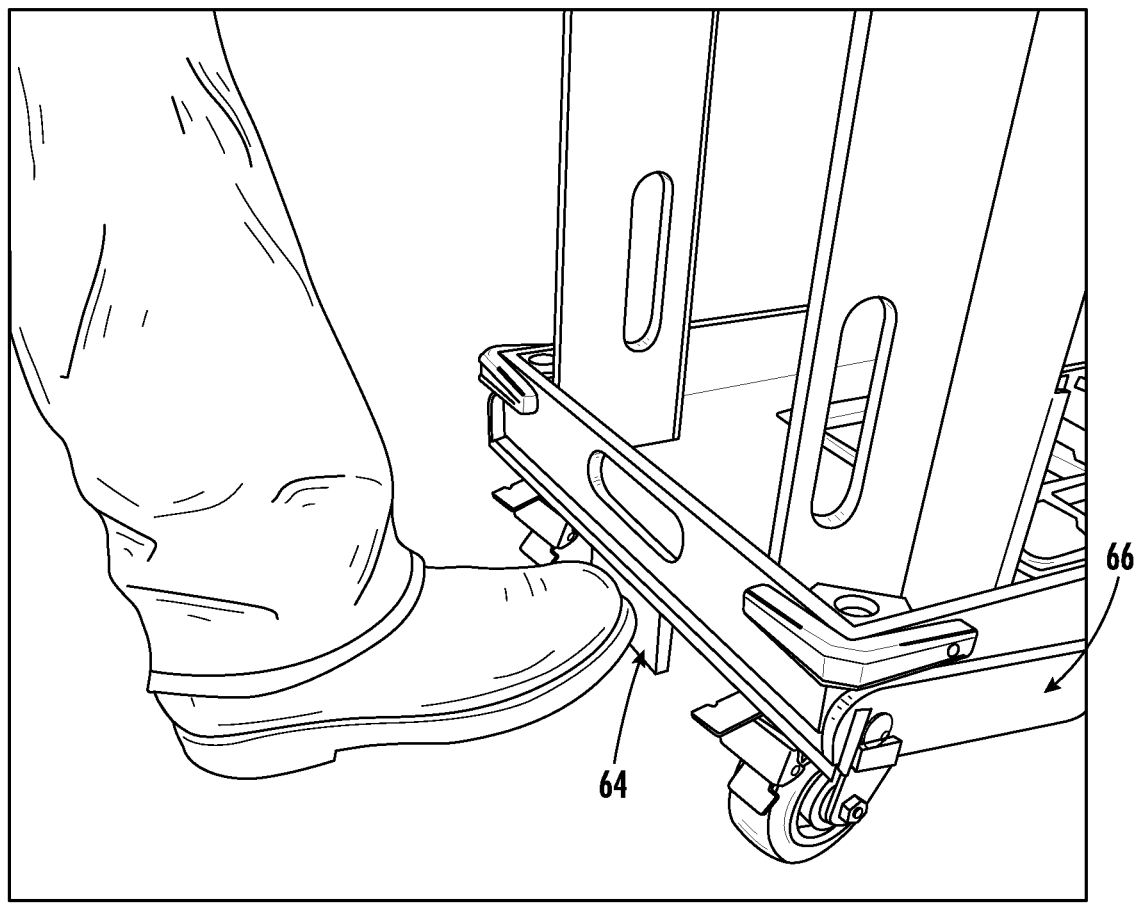
FIG. 19 is a perspective view of the mobile device of FIG. 1, according to an exemplary embodiment.

Referring to FIGS. 15-16, to rotate kickstand 60 from the unlocked position to the locked position, a user extends their foot to interface with projection 64 (FIG. 15). The user rotates projection 64 opposite direction 74 to actuate kickstand from the unlocked position to the locked position (FIG. 16). FIGS. 17-19 show an exemplary process for reversing the process and actuating kickstand 60 from the locked position to the unlocked position.

Referring to FIGS. 20-51, a container, unit and/or device, shown as a mobile storage device 310 is shown. Mobile storage device 310 is substantially the same as mobile work cart 10 except for the differences discussed herein.

Figure 20:
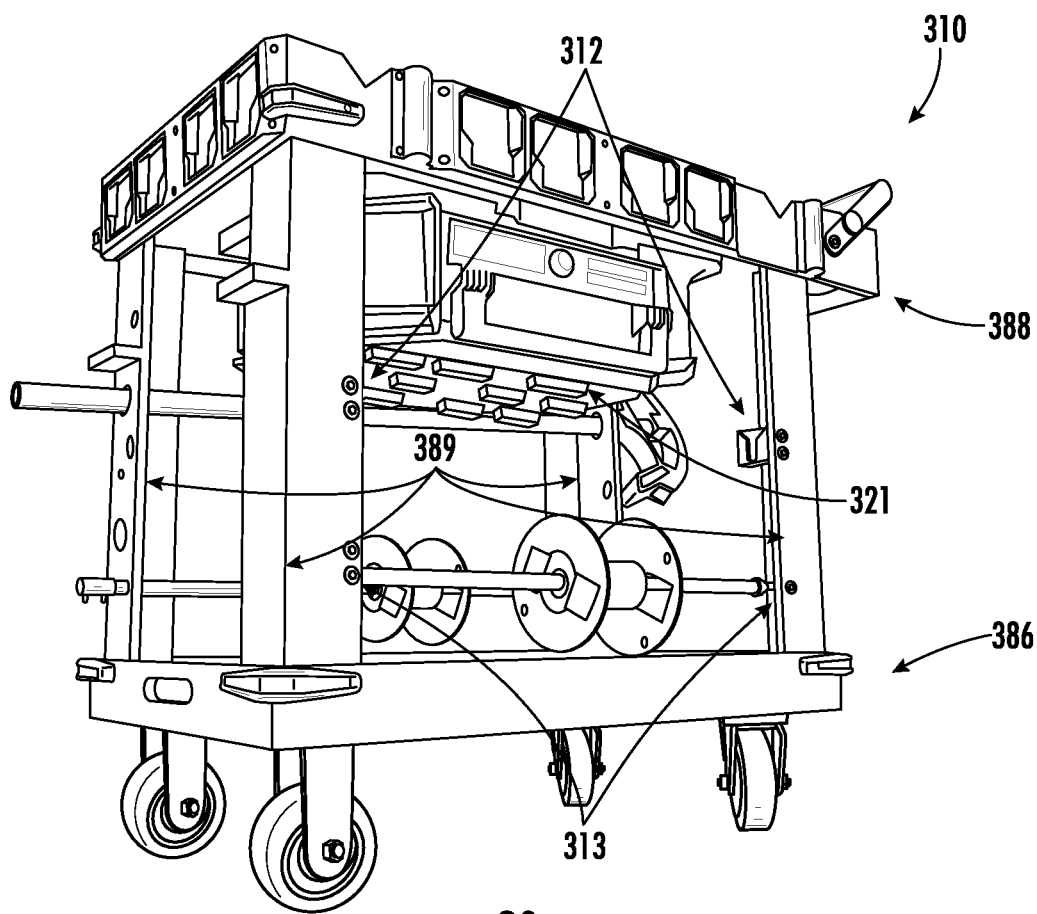
FIG. 20 is a perspective view of a mobile device, according to an exemplary embodiment.
Figure 21:
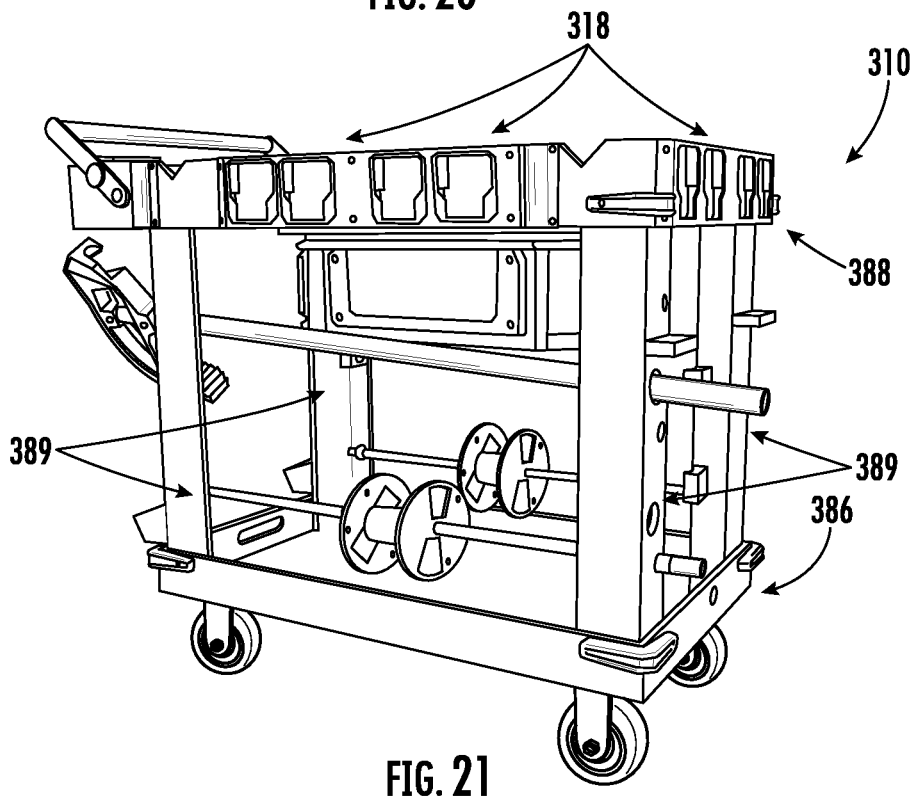
FIG. 21 is a perspective view of the mobile device of FIG. 20, according to an exemplary embodiment.
Figure 22:
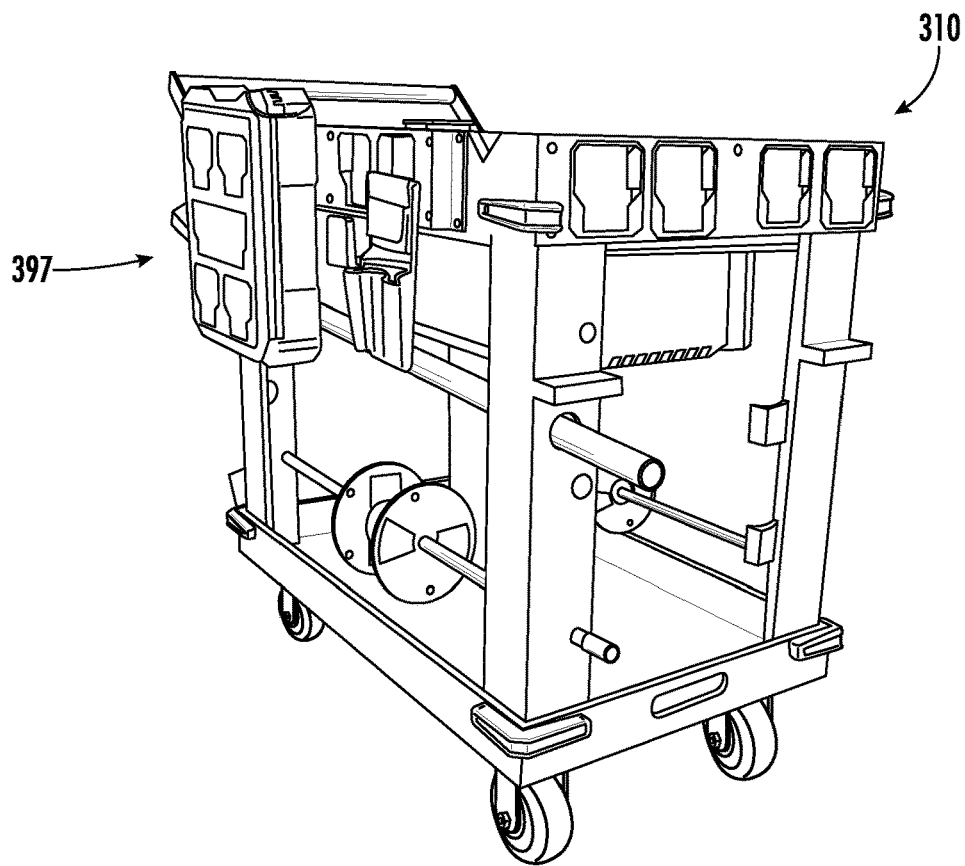
FIG. 22 is a perspective view of the mobile device of FIG. 20 coupled to a modular storage unit, according to an exemplary embodiment.
Figure 23:
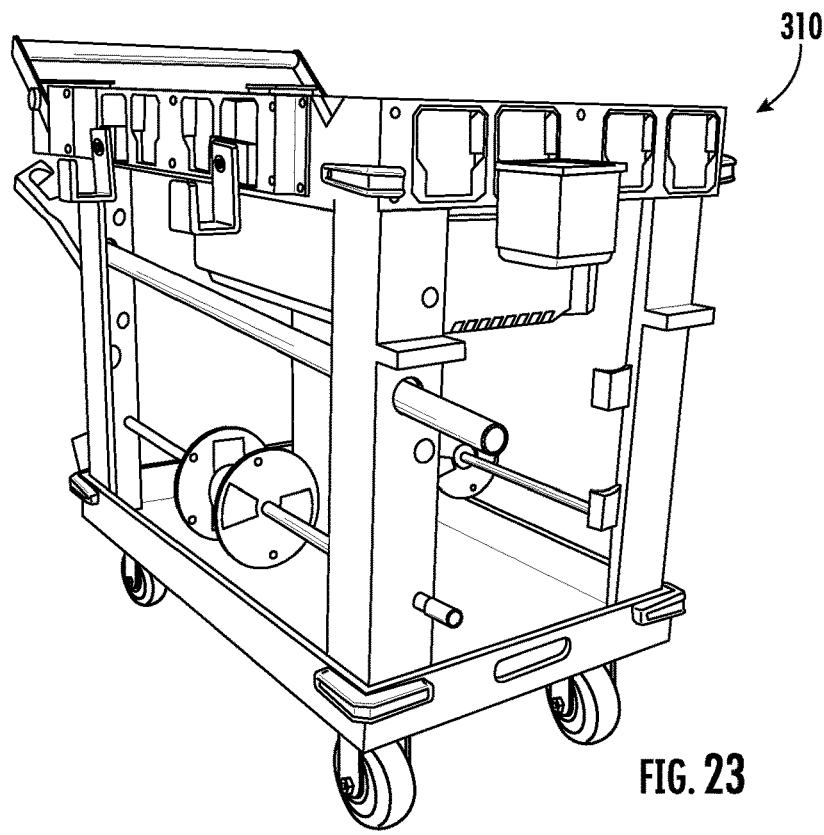
FIG. 23 is a perspective view of the mobile device of FIG. 20 coupled to a modular storage unit, according to an exemplary embodiment.
Figure 24:
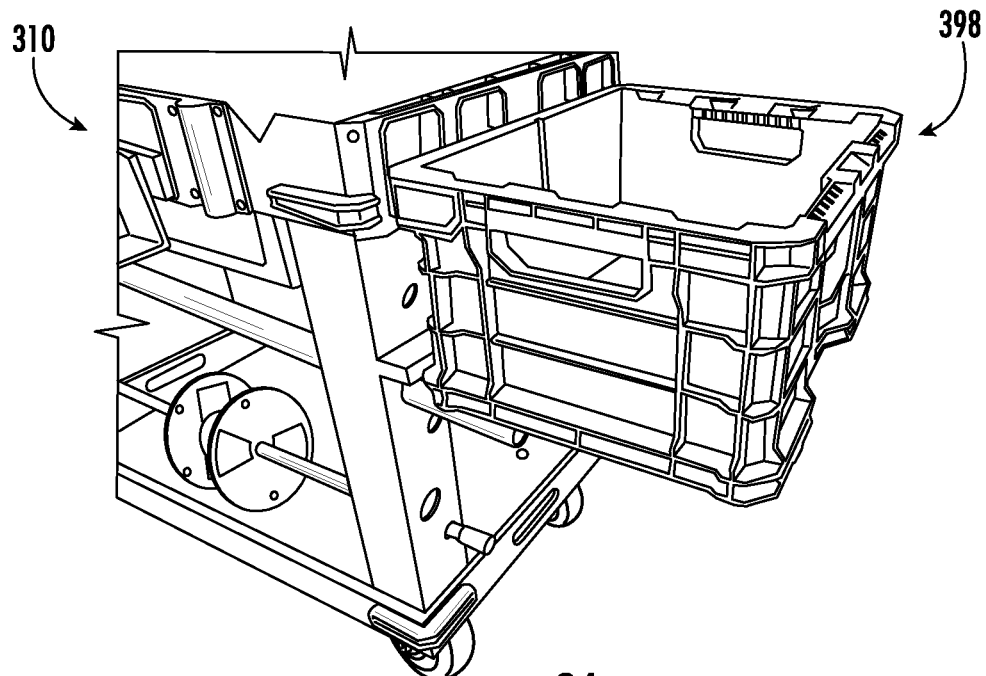
FIG. 24 is a perspective view of the mobile device of FIG. 20 coupled to a modular storage unit, according to an exemplary embodiment.
Figure 25:
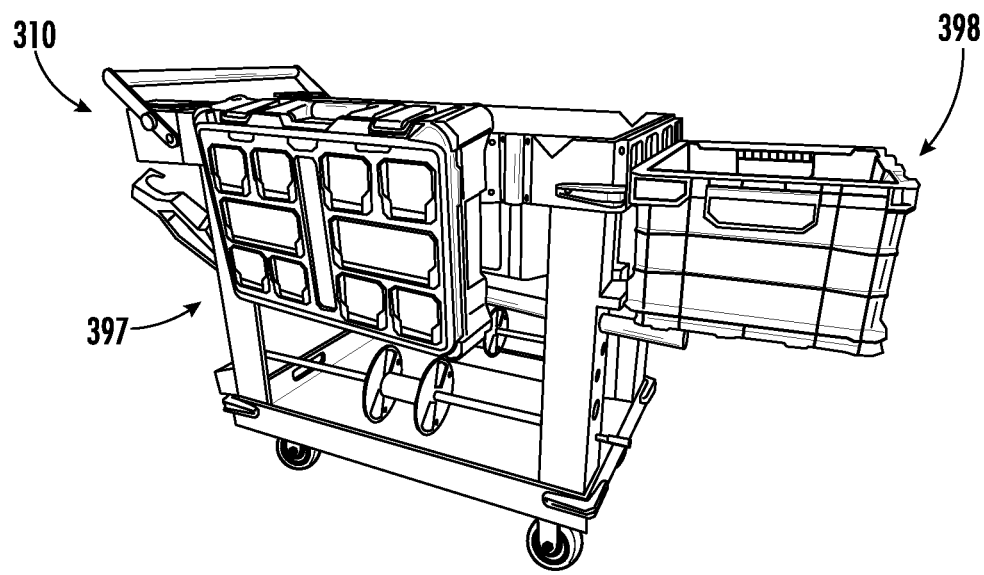
FIG. 25 is a perspective view of the mobile device of FIG. 20 coupled to two modular storage units, according to an exemplary embodiment.
Figure 26:
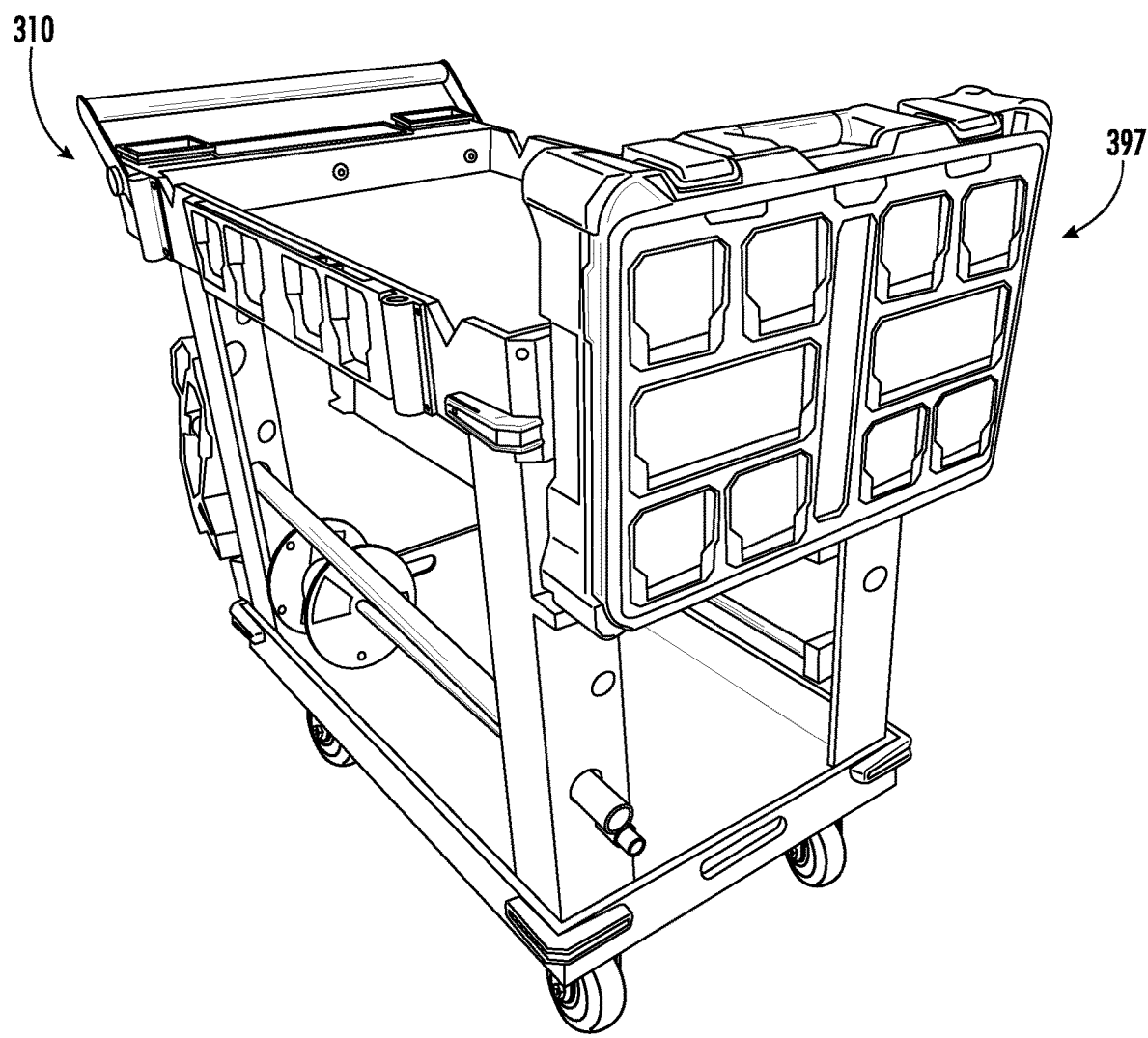
FIG. 26 is a perspective view of the mobile device of FIG. 20 coupled to a modular storage unit, according to an exemplary embodiment.
Figure 27:
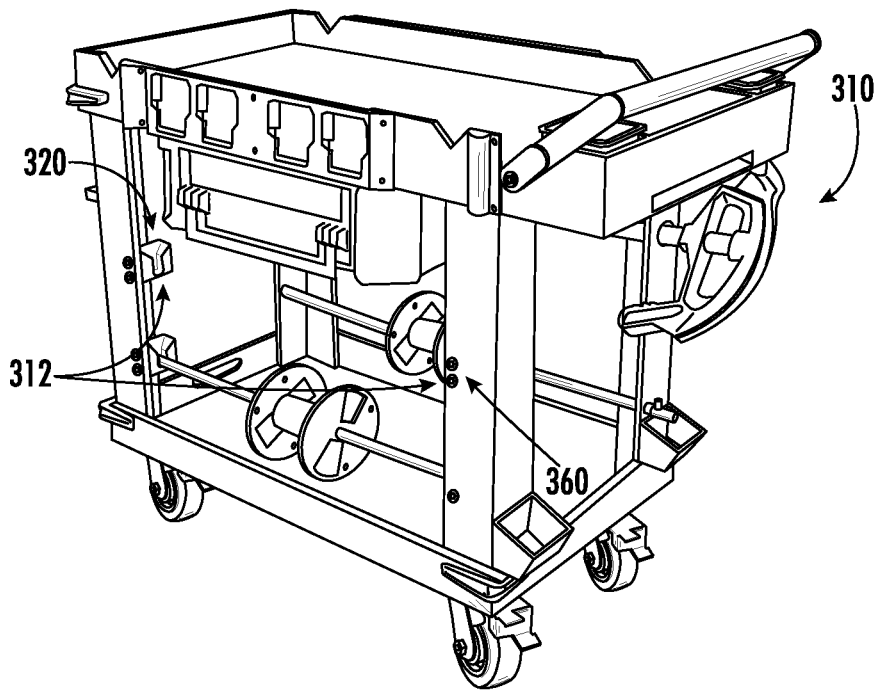
FIG. 27 is a perspective view of the mobile device of FIG. 20, according to an exemplary embodiment.
Figure 28:
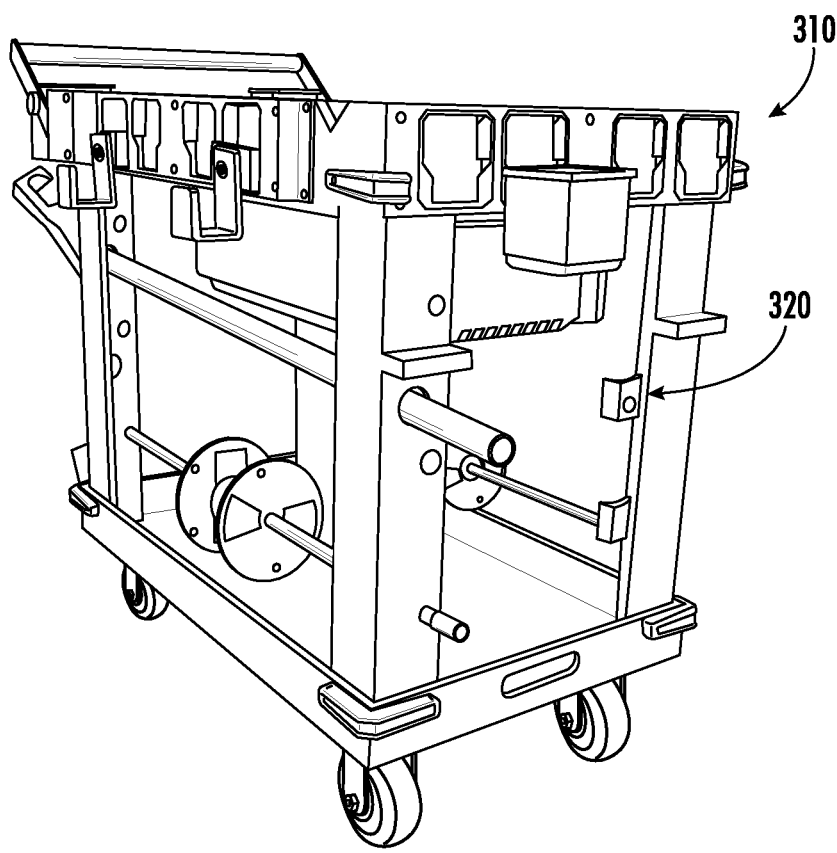
FIG. 28 is a perspective view of the mobile device of FIG. 20, according to an exemplary embodiment.

Mobile storage device 310 includes coupling assembly 312 and coupling assembly 313 coupled to legs 389. Legs 389 extend between lower housing 386 and upper housing 388. Upper housing 388 includes one or more couplers 318 extending around upper housing 388. In a specific embodiment, couplers are compatible with the coupling mechanisms described in International Patent Application No. PCT/US2018/044629, which is incorporated herein by reference in its entirety. Referring to FIG. 20, in various embodiments a unit, such as a modular storage unit, is coupled to the bottom of the upper housing, the modular storage unit including one or more coupling mechanisms, shown as male couplers 321. Male couplers 321 include two tongues that extend from the male coupler 321 and are configured to coupled with other coupling mechanisms, such as coupling interface 80. Referring to FIGS. 22-26, modular storage unit 397 and modular storage unit 398 detachably couple to couplers 318, which are arranged upper housing 388.

Referring to FIGS. 27-38, various aspects of coupling assembly 312 are shown. Coupling assembly 312 includes coupling element 320 coupled to a leg, such as a first leg of a plurality of legs, and coupling element 360 is coupled to a different leg, as will be described in more detail below. coupling element 320 and coupling element 360 are each configured to receive an elongate support structure, such as a cylinder.

Figure 29:
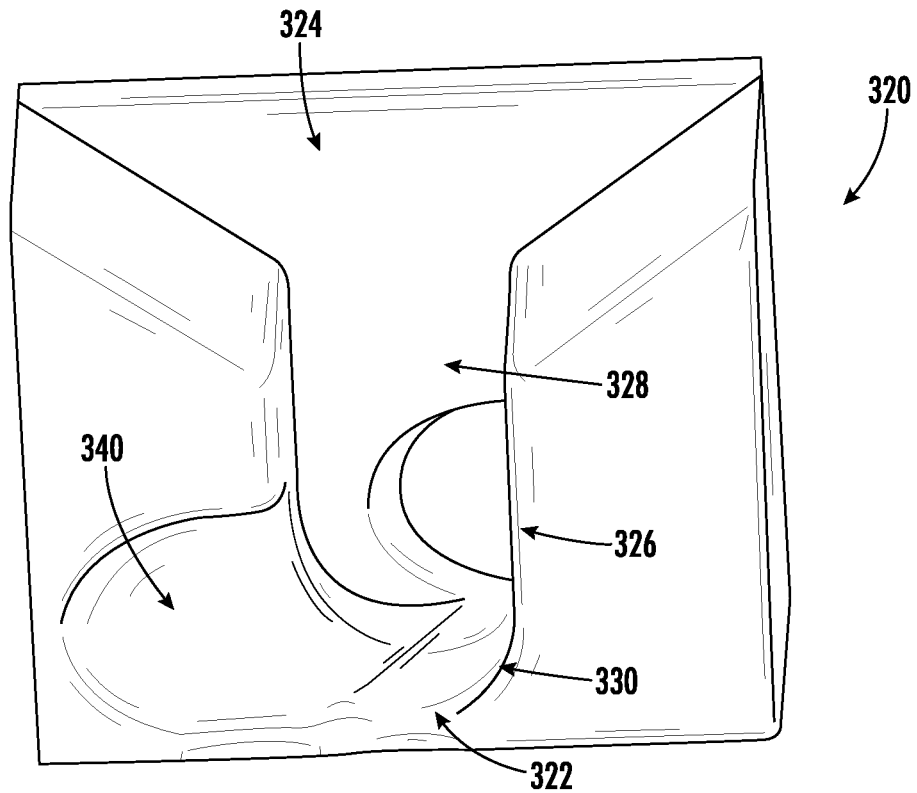
FIG. 29 is a perspective view of a coupling element of the mobile device of FIG. 20, according to an exemplary embodiment.
Figure 30:
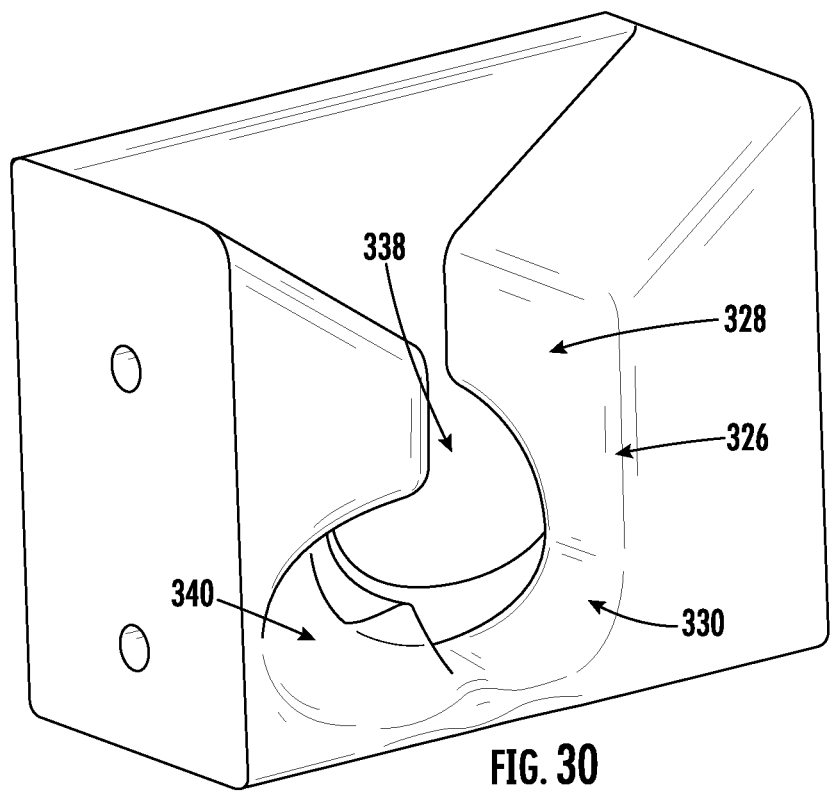
FIG. 30 is a perspective view of the coupling element of FIG. 29, according to an exemplary embodiment.
Figure 31:
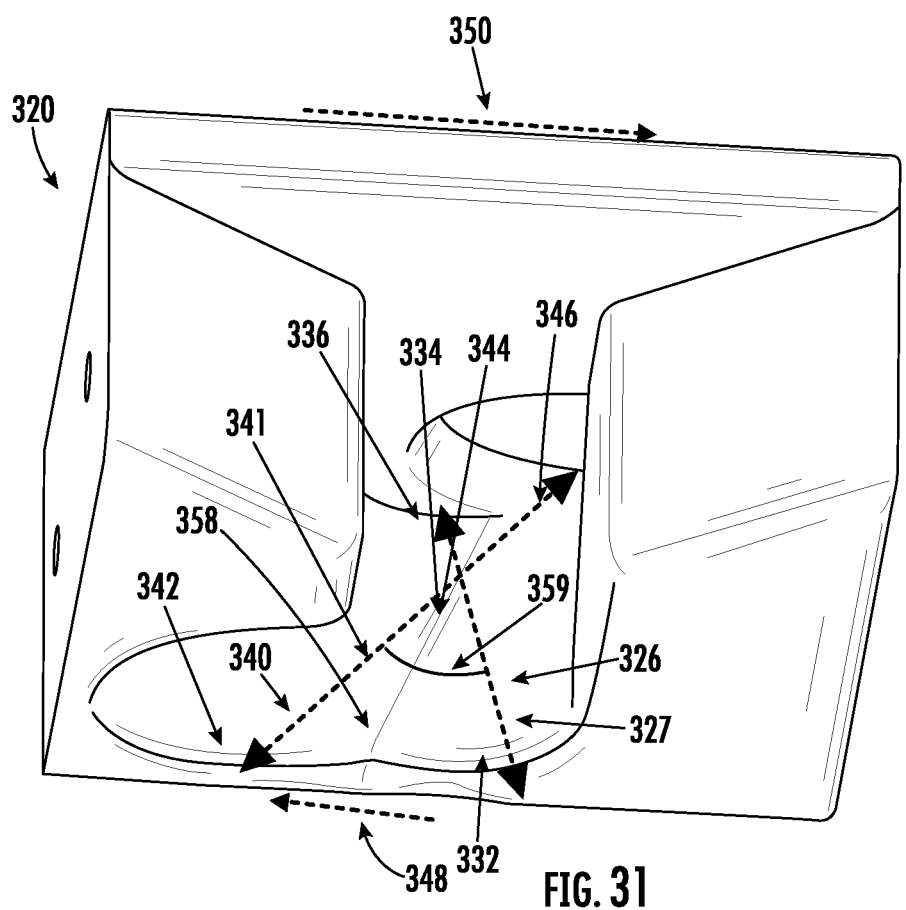
FIG. 31 is a perspective view of the coupling element of FIG. 29, according to an exemplary embodiment.
Figure 32:
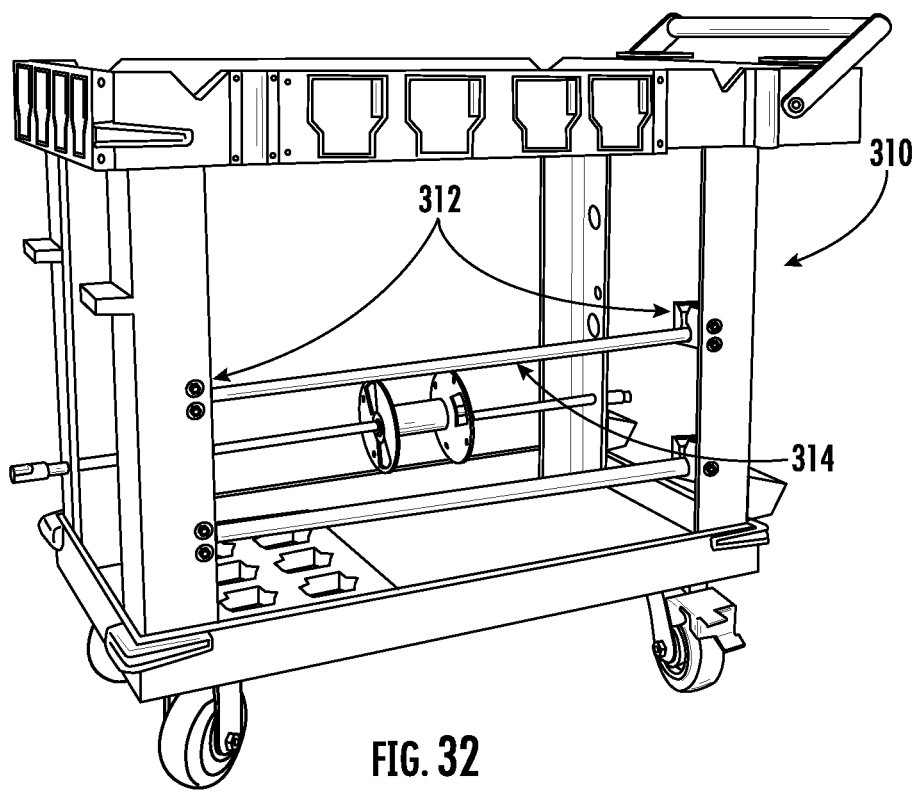
FIG. 32 is a perspective view of the mobile device of FIG. 20, according to an exemplary embodiment.

Referring to FIGS. 29-31, coupling element 320 includes lower wall 322 extending laterally across a bottom of coupling element 320. Rear wall 324 extends upward, such as vertically, from lower wall 322 away from lower housing 386.

As will be described in more details below, coupling element 320 receives a cylinder, such as a pipe. The cylinder can be arranged within coupling element 320 in two or more positions, shown as primary channel 326 and angled channel 340. Primary channel 326 extends along first axis 327 and angled channel 340 extends along second axis 341. Primary channel 326 extends through coupling element 320 from front portion 332 furthest from rear wall 324, through middle portion 334 to rear portion 336 near rear wall 324. In a specific embodiment, primary channel 326 extends horizontally. Primary channel 326 also extends vertically from lower portion 330 near lower wall 322 to upper portion 328.

Angled channel 340 extends through coupling element 320 from a front portion 342 furthest from rear wall 324, through middle portion 344 to rear portion 346 near rear wall 324 and aperture 338. In a specific embodiment, angled channel 340 extends horizontally. Front portion 342 of angled channel 340 is displaced in first direction 348 with respect to front portion 332 of primary channel 326. Rear portion 346 of angled channel 340 is displaced in second direction 350 opposite first direction 348 with respect to rear portion 336 of primary channel 326. Front portion 342 of angled channel 340 is separated from front portion 332 of primary channel 326 by protrusion 358. In various embodiments, protrusion 358 extends upward from the lower wall 322 between the primary channel 326 and the angled channel 340. Referring to FIG. 31, for illustrative purposes, exemplary embodiments of primary channel 326 and angled channel 340 are depicted via large dotted lines with arrows. Angled channel 340 extends through primary channel 326 at angle 359, such as when viewed from above (e.g., from a top perspective angled channel 340 defines angle 359 relative primary channel 326). In a specific embodiment, angle 359 is at least 30 degrees, and more specifically between 30 degrees and 60 degrees, and more specifically is between 40 degrees and 50 degrees, and more specifically is 45 degrees. In various embodiments, angle 359 is at least 30 degrees and less than 60 degrees. In various embodiments, angled channel 340 extends horizontally relative to a floor the mobile tool support device is positioned on.

In a specific embodiment, primary channel 326 is aligned with at least a portion of the rear wall 324 thereby preventing the elongate support structure from extending past the rear wall 324 when transiting the primary channel along the first axis 327. In a specific embodiment, angled channel 340 is aligned with aperture 338 and extends through aperture 338 thereby permitting the elongate support structure to extend past the rear wall 324 when transiting the angled channel 340 along the second axis 341. Primary channel 326 is in fluid communication with aperture 338 via angled channel 340. In a specific embodiment, middle portion 344 of angled channel 340 and middle portion 334 of primary channel 326 are coextensive.

Referring to FIGS. 32-38, depicted is an exemplary method for loading a piece of equipment, shown as wire roll 395, on cylinder 314 coupled to coupling assembly 312. In use, wire roll 395 is permitted to rotate with respect to cylinder 314, thereby allowing wire on wire roll 395 to be dispensed.

Figure 33:
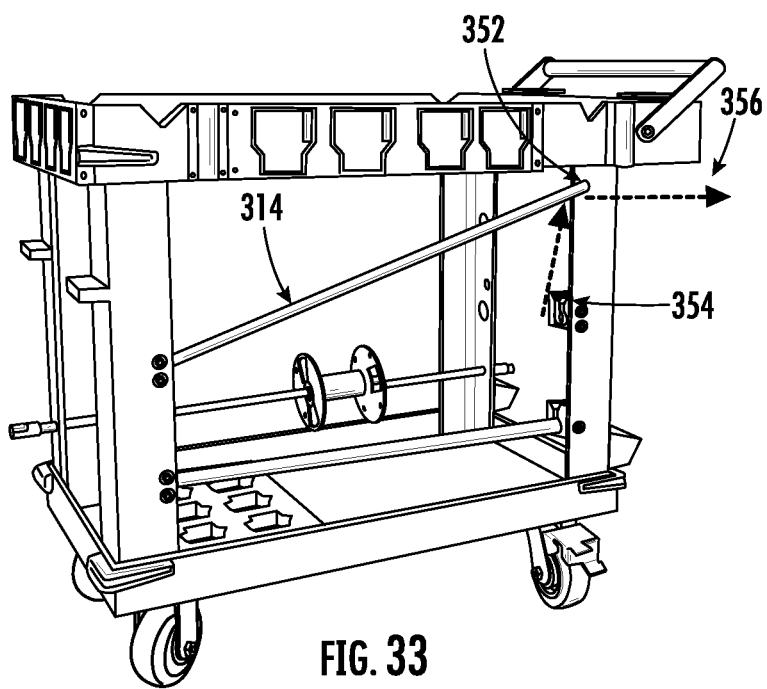
FIG. 33 is a perspective view of the mobile device of FIG. 20, according to an exemplary embodiment.
Figure 34:
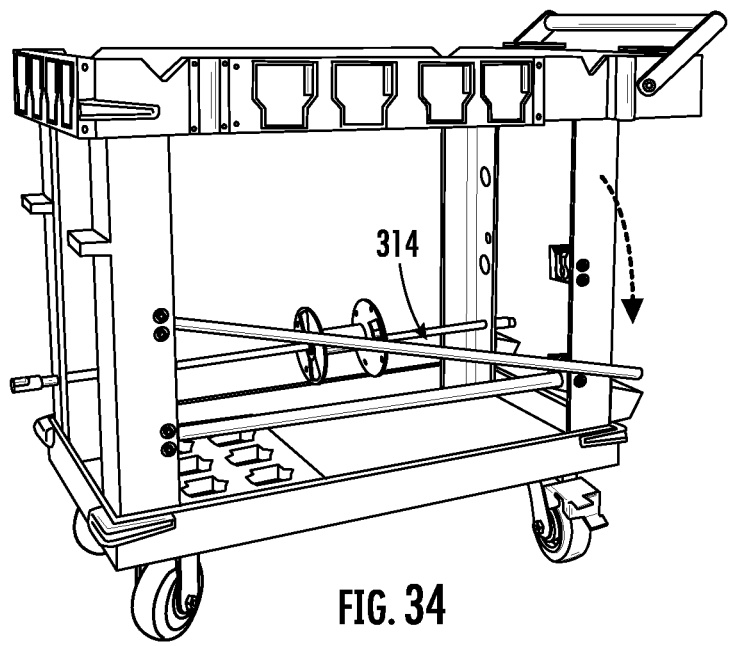
FIG. 34 is a perspective view of the mobile device of FIG. 20, according to an exemplary embodiment.
Figure 35:
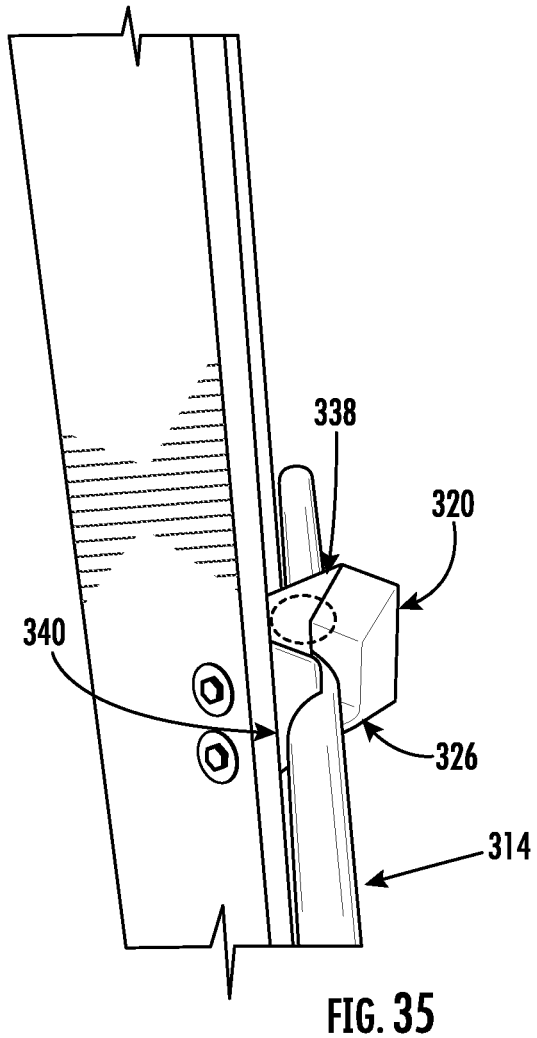
FIG. 35 is a detailed perspective view of the coupling element of FIG. 29 and the mobile device of FIG. 20, according to an exemplary embodiment.
Figure 36:
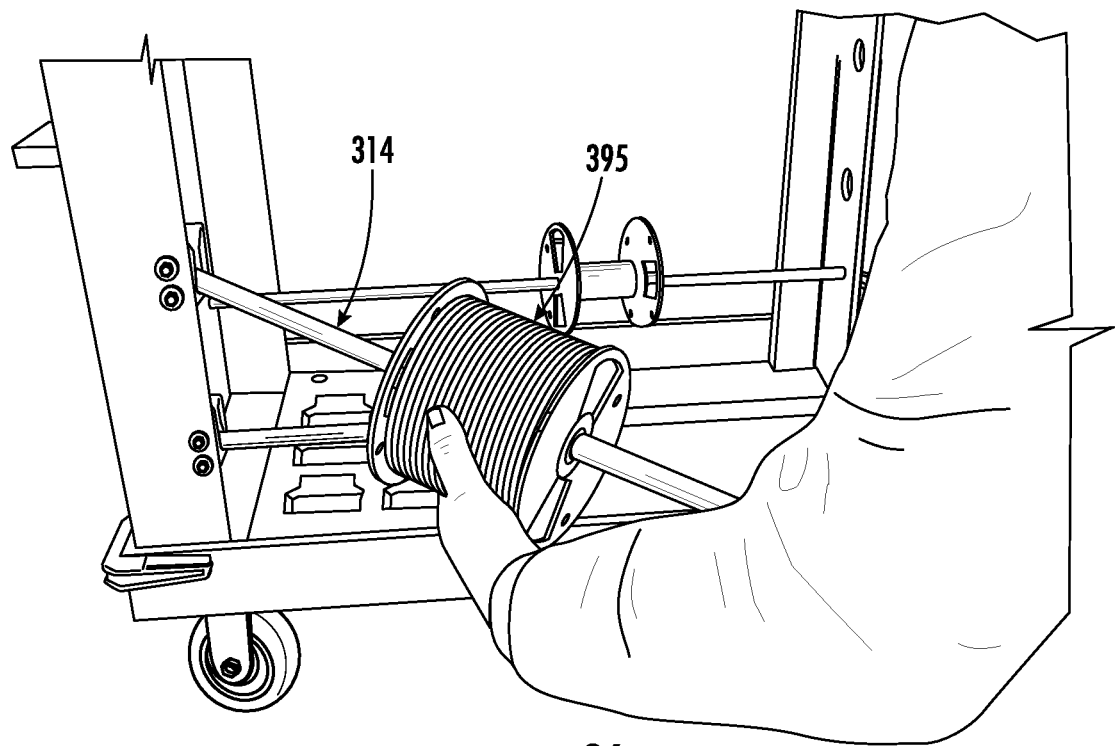
FIG. 36 is a perspective view of the mobile device of FIG. 20, according to an exemplary embodiment.
Figure 37:
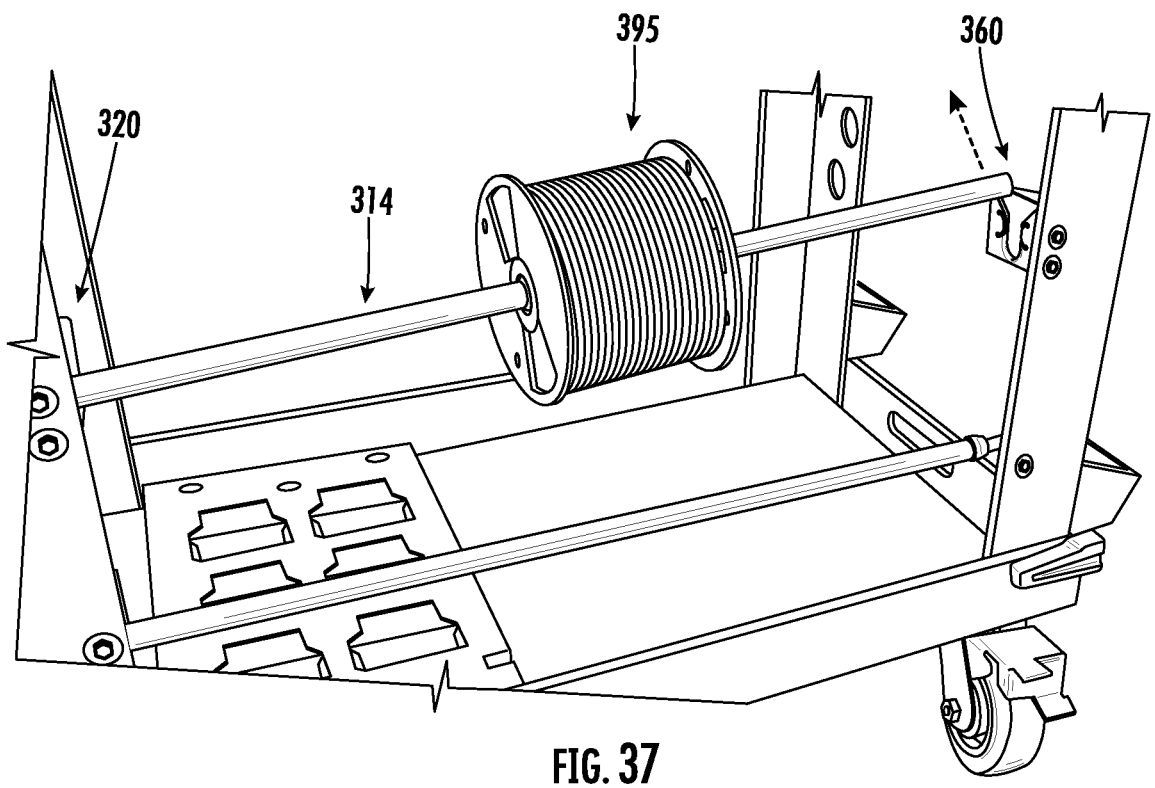
FIG. 37 is a perspective view of the mobile device of FIG. 20, according to an exemplary embodiment.
Figure 38:
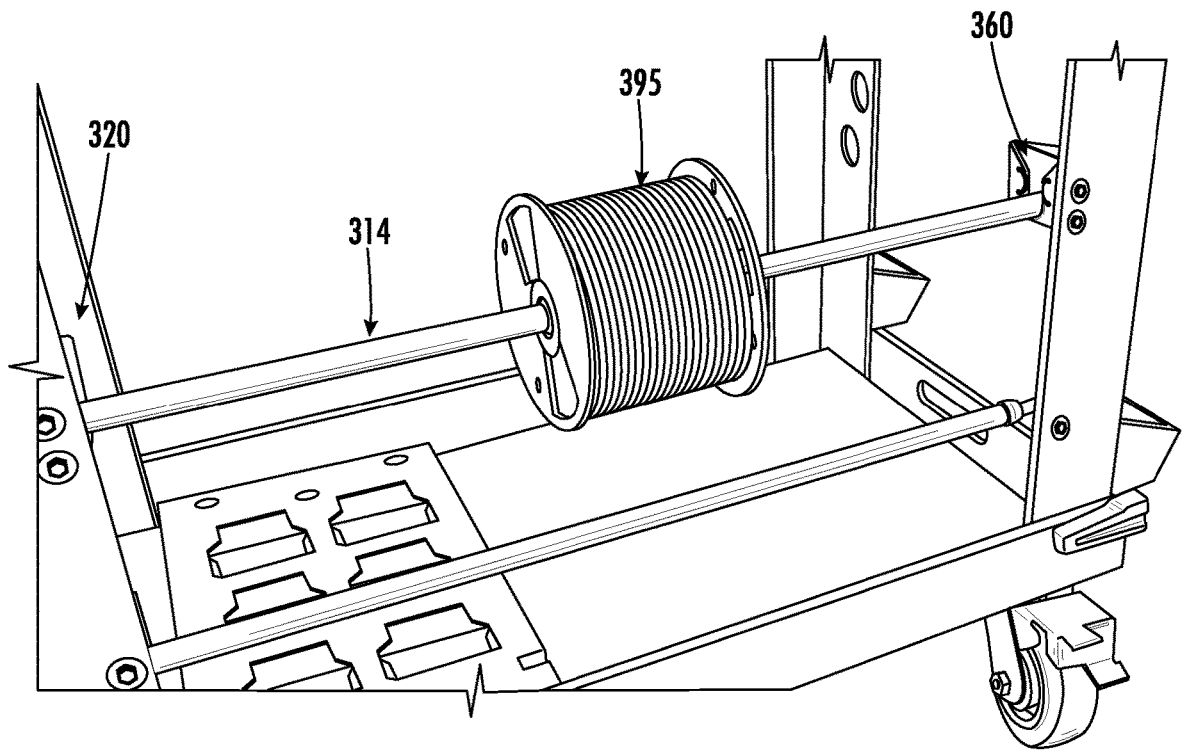
FIG. 38 is a detailed perspective view of the mobile device of FIG. 20, according to an exemplary embodiment.
Figure 39:
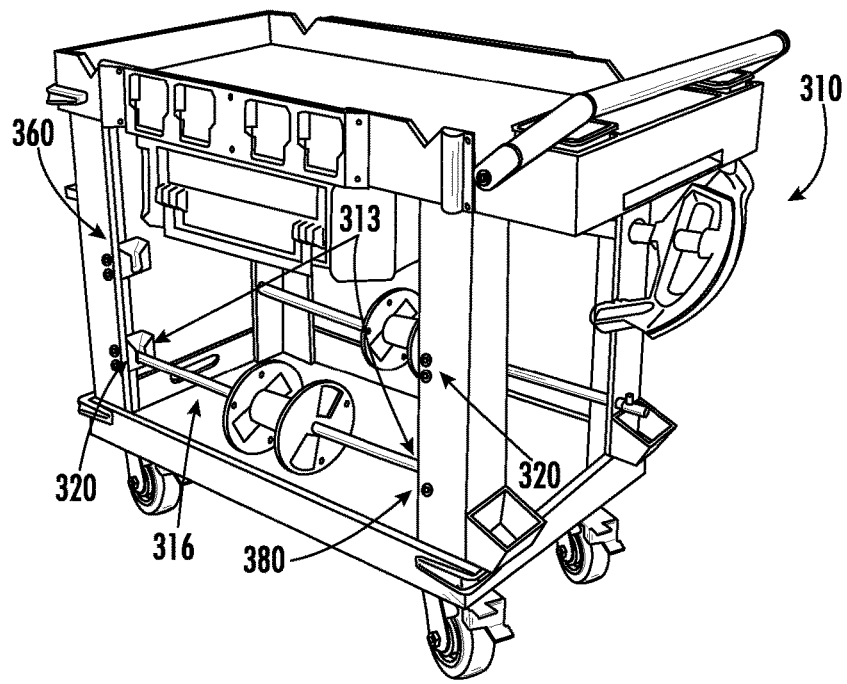
FIG. 39 is a perspective view of the mobile device of FIG. 20, according to an exemplary embodiment.

Starting at FIG. 33, end 352 of cylinder 314 is pivoted in the upward direction 354 and outward direction 356 away from mobile storage device 310. Cylinder 314 is positioned in angled channel 340 and inserted through aperture 338 (FIG. 35). In this position, cylinder 314 can be rested within coupling element 320 such that cylinder 314 does not need to be supported by the user. Then, a user slides a supply, shown as wire roll 395, on cylinder 314 (FIG. 36). End 352 of cylinder 314 is pivoted back towards coupling element 360 (FIG. 37), and finally end 352 of cylinder 314 is inserted into coupling element 360 thereby creating a tactile and/or audible indication that cylinder 314 is secured within coupling element 360. Coupling element 360 is described in more detail immediately below.

Referring to FIGS. 39-47, various aspects of coupling assembly 313 are shown. Coupling assembly 313 includes coupling element 360 coupled to a first leg and a second coupling element, shown as pivoting hinge 380, coupled to a second leg distinct from the first leg. Cylinder 316 extends between coupling element 360 and hinge 380.

Figure 40:
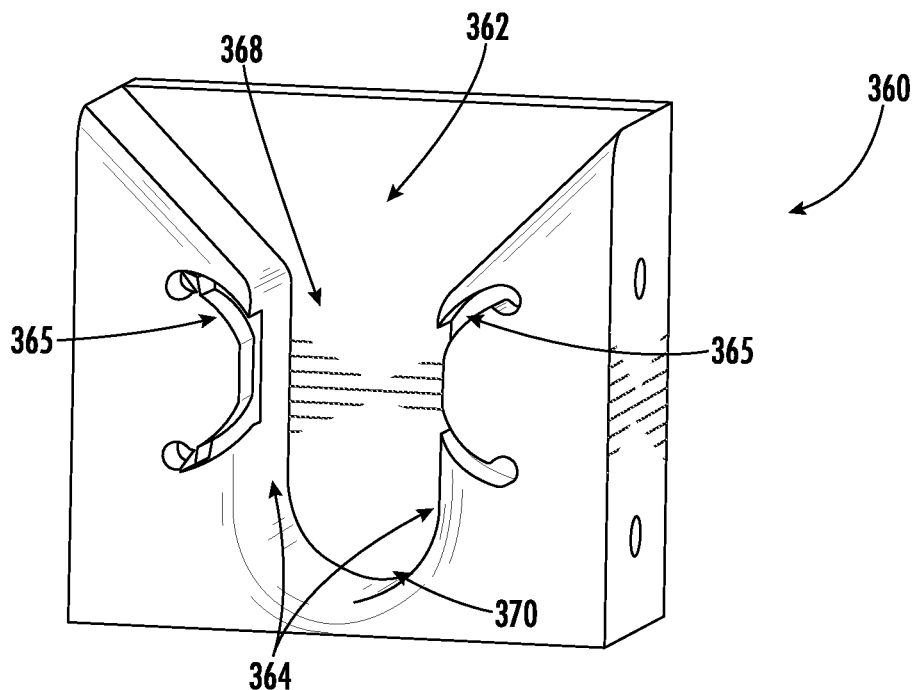
FIG. 40 is a perspective view of a coupling element of the mobile device of FIG. 20, according to an exemplary embodiment.
Figure 41:
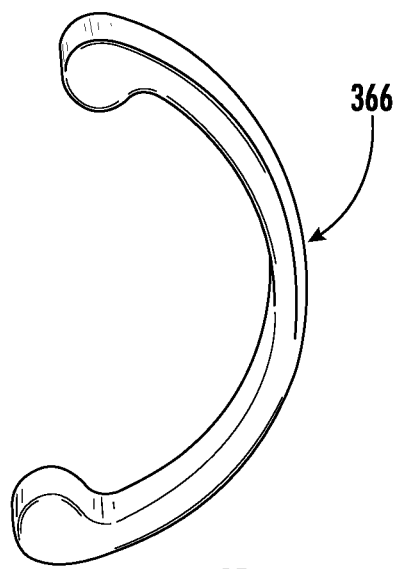
FIG. 41 is a perspective view of a biasing element of the coupling element of FIG. 40, according to an exemplary embodiment.
Figure 42:
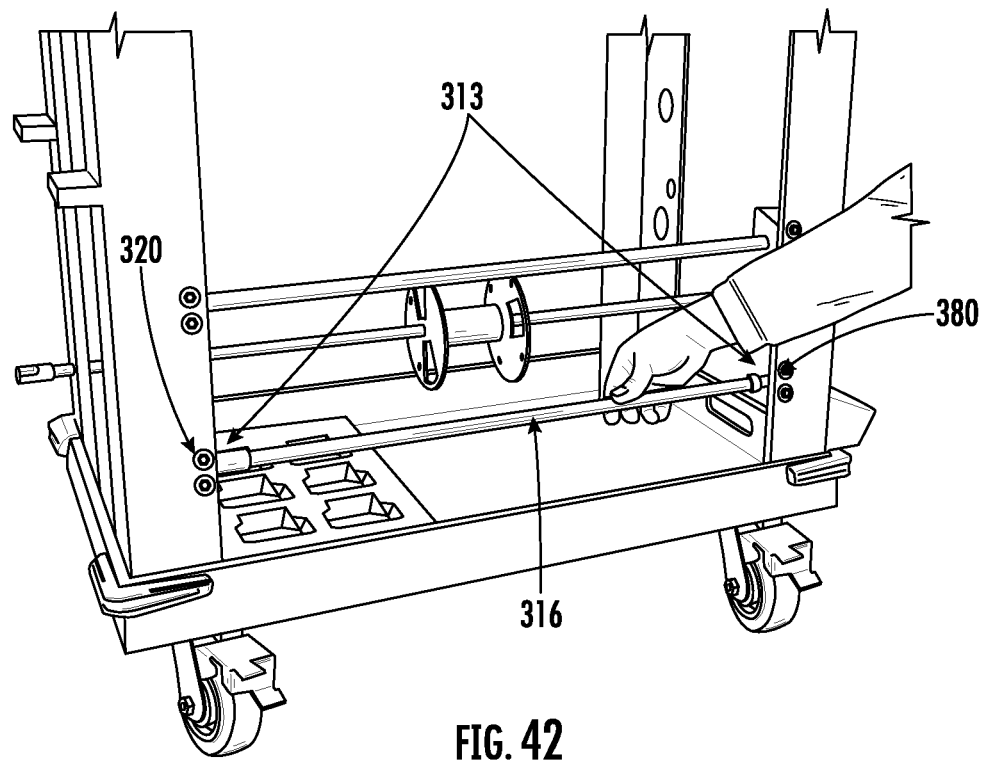
FIG. 42 is a perspective view of the mobile device of FIG. 20, according to an exemplary embodiment.
Figure 43:
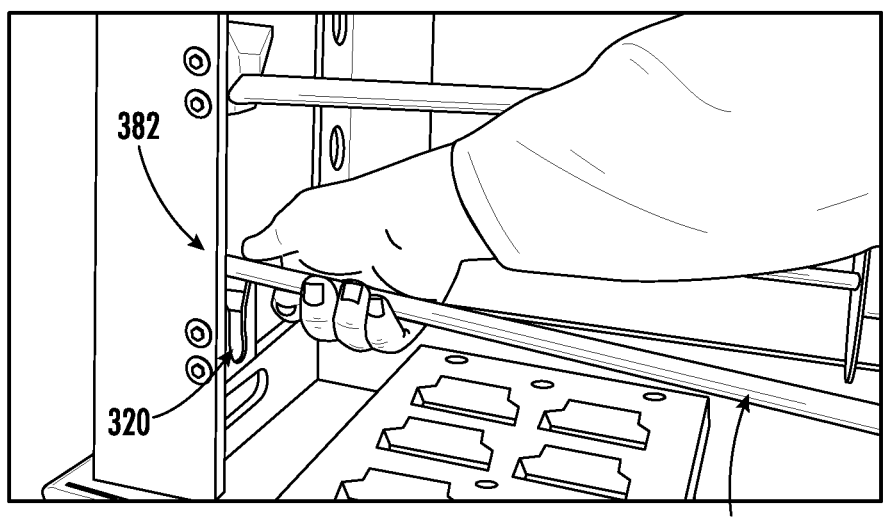
FIG. 43 is a detailed perspective view of the mobile device of FIG. 20, according to an exemplary embodiment.
Figure 44:
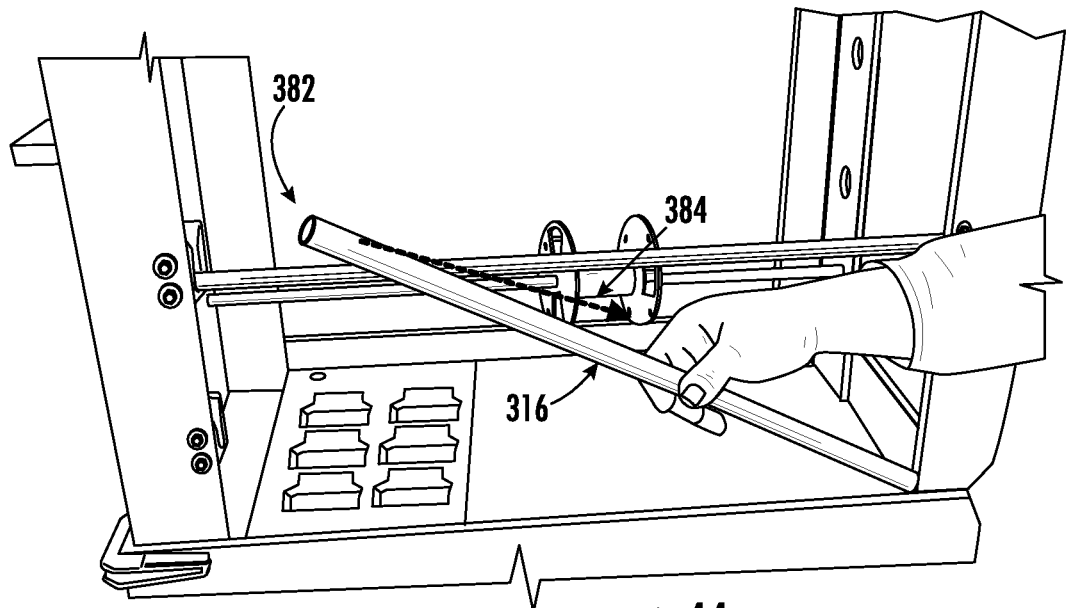
FIG. 44 is a perspective view of the mobile device of FIG. 20, according to an exemplary embodiment.

Referring to FIGS. 40-41, coupling element 360 includes primary channel 362 extending vertically through coupling element 360. Sides 364 of primary channel 362 define a lateral perimeter of primary channel 362. In various embodiments, coupling element 360 is configured to receive the elongate support structure when the elongate support structure is extending through the primary channel 326 of a first coupling element 320 along the first axis 327.

Recesses 365 receive biasing elements, shown as springs 366. When a cylinder is inserted through upper portion 368 past springs 366 into lower portion 370, an audible click and/or tactile vibration is generated by springs 366, thereby signaling the cylinder is within lower portion 370 of coupling element 360. Spring 366 biases the cylinder from entering and existing lower portion 370 of primary channel 362. In a specific embodiment, springs 366 are arranged symmetrically on either side of primary channel 362.

Referring to FIGS. 42-47, depicted is an exemplary method for loading a piece of equipment, shown as wire roll 395, on cylinder 316 coupled to coupling assembly 313. Starting at FIG. 43, end 382 of cylinder 316 is removed from coupling element 360. End 382 of cylinder 316 is rotated in direction 384 away from mobile storage device 310. The opposing end of cylinder 316 is coupled to hinge 380. In a specific embodiment, hinge 380 permits cylinder 316 to pivot vertically and laterally.

Figure 45:
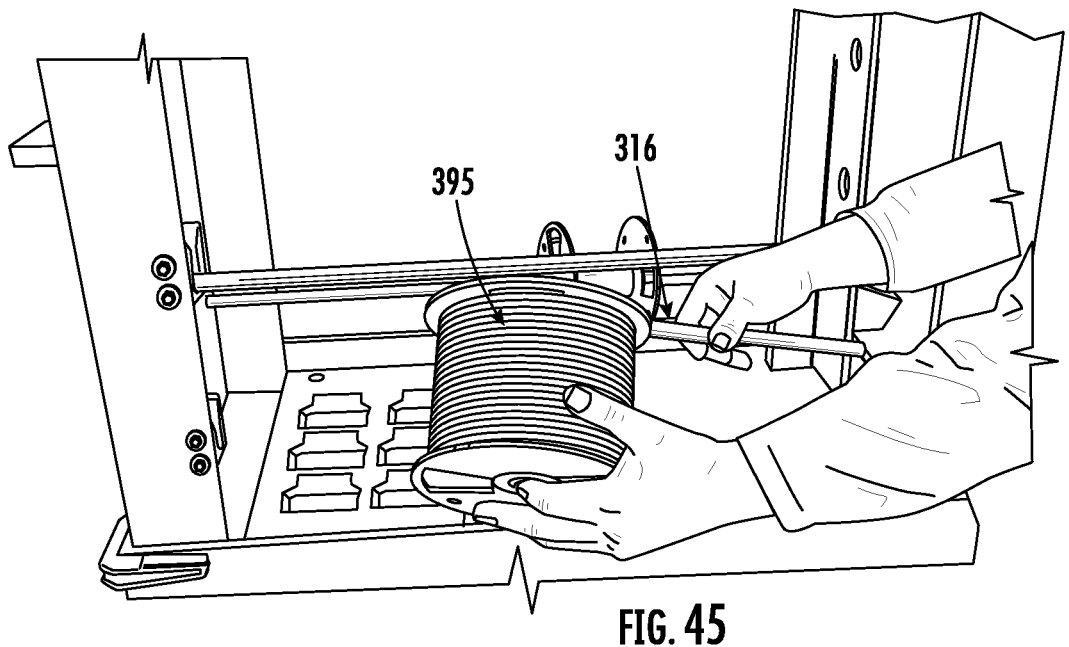
FIG. 45 is a perspective view of the mobile device of FIG. 20, according to an exemplary embodiment.
Figure 46:
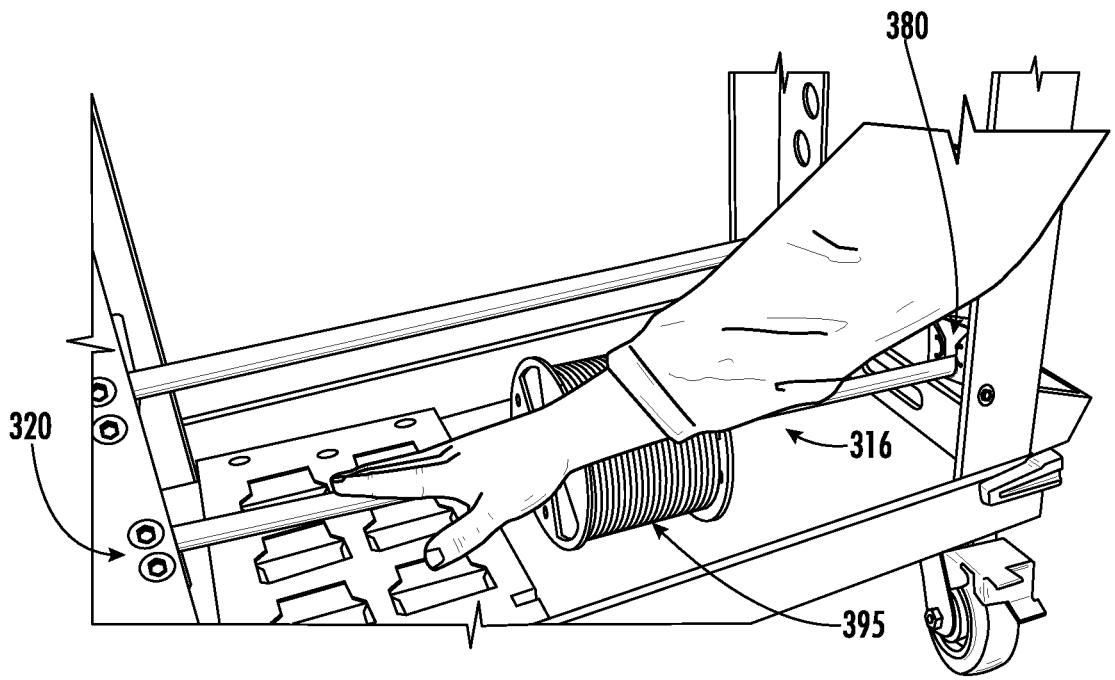
FIG. 46 is a perspective view of the mobile device of FIG. 20, according to an exemplary embodiment.
Figure 47:
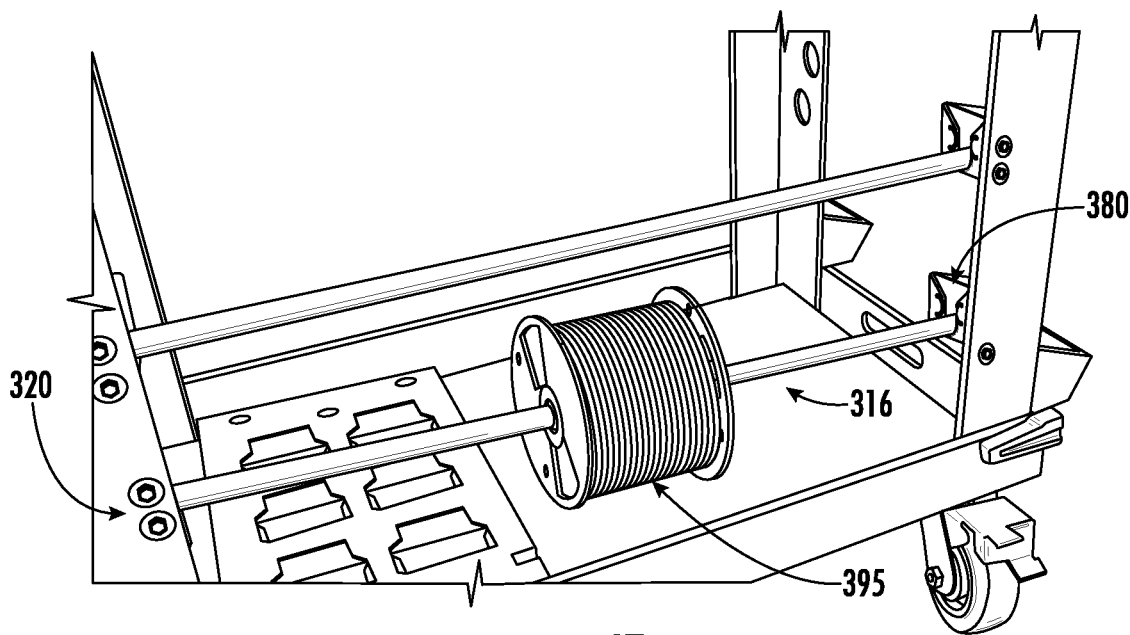
FIG. 47 is a perspective view of the mobile device of FIG. 20, according to an exemplary embodiment.
Figure 48:
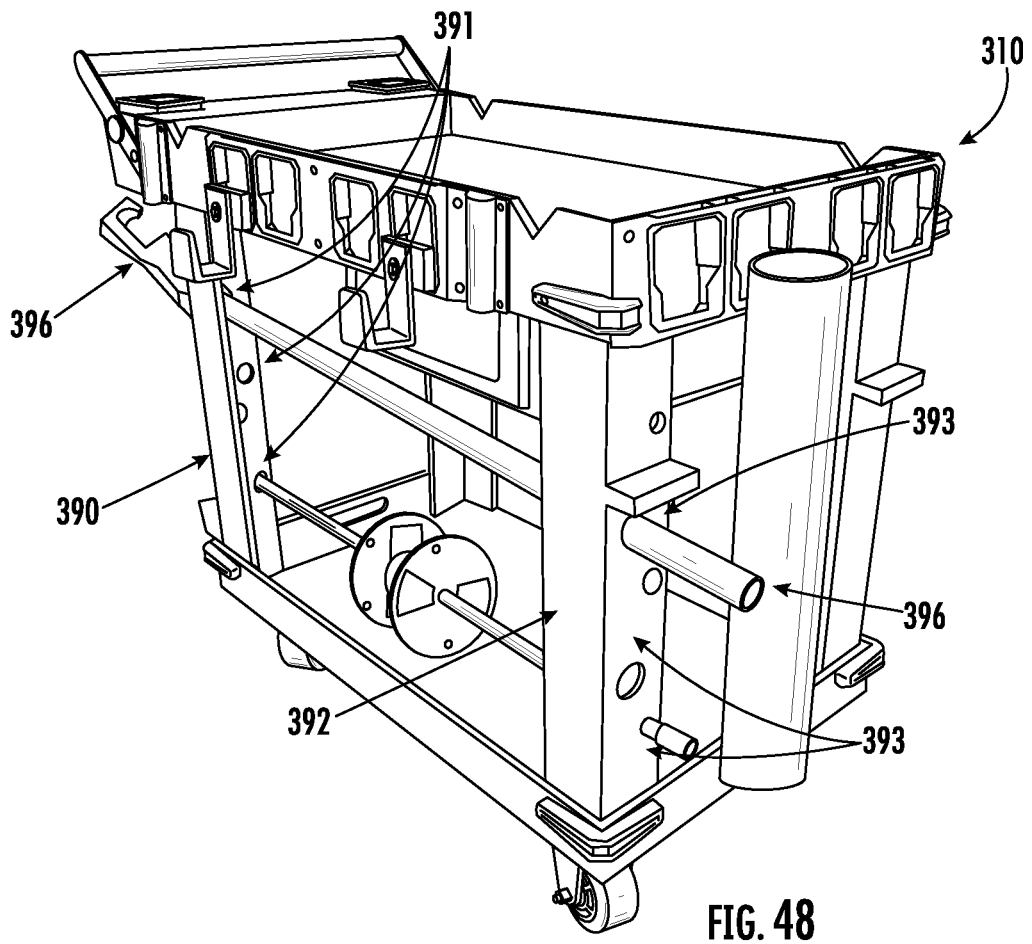
FIG. 48 is a perspective view of the mobile device of FIG. 20 and a tool coupled to the legs, according to an exemplary embodiment.
Figure 49:
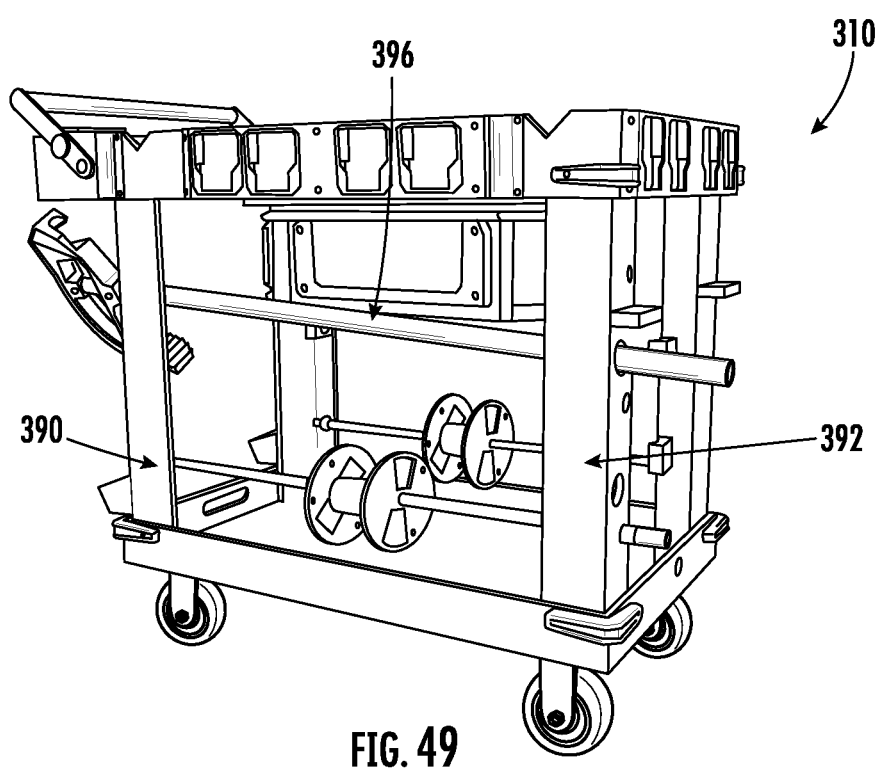
FIG. 49 is a side view of the mobile device of FIG. 20 and the tool of FIG. 48, according to an exemplary embodiment.
Figure 50:
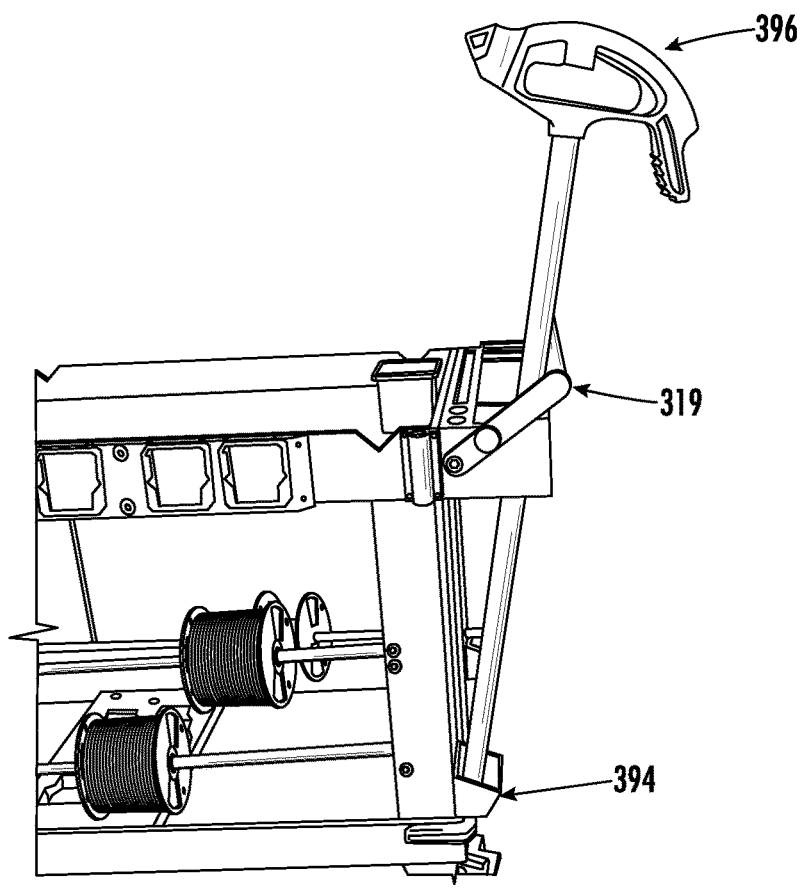
FIG. 50 is a side view of the mobile device of FIG. 20 and the tool of FIG. 48, according to an exemplary embodiment.
Figure 51:
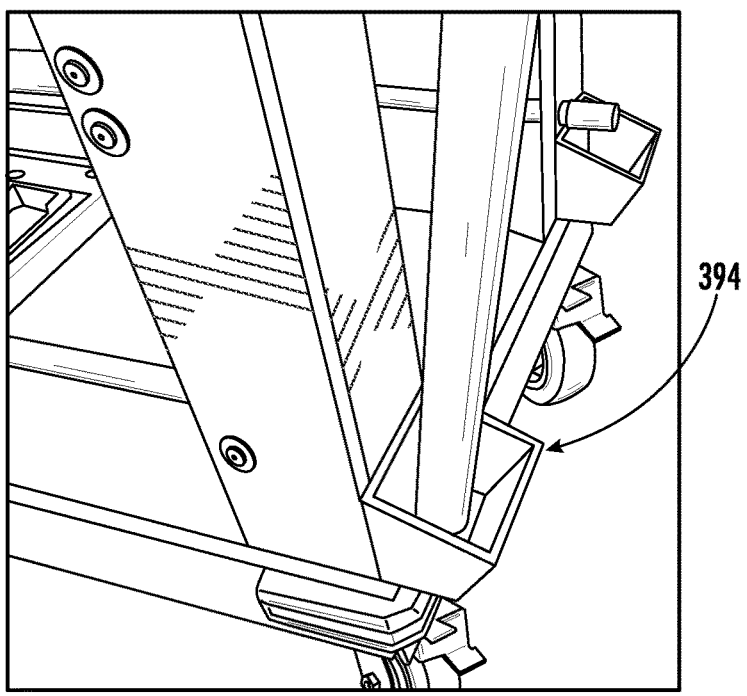
FIG. 51 is a detailed perspective view of the mobile device of FIG. 20 and a portion of the tool of FIG. 48, according to an exemplary embodiment.

Wire roll 395 is inserted onto cylinder 316 (FIG. 45). End 382 of cylinder 316 is rotated back to coupling element 360 (FIG. 46) until end 382 is inserted past springs to lower portion 370 of coupling element 360 (FIG. 47).

Referring to FIGS. 48-51, aspects of mobile storage device 310 receiving a tool are shown. First leg 390 includes a plurality of receiving elements, shown as apertures 391. Second leg 392 includes a plurality of receiving elements, shown as apertures 393.

In a specific embodiment, apertures 393 in second leg 392 are vertically offset slightly lower than corresponding apertures 391 in first leg 390. As a result, when a tool, shown as conduit bender 396, is inserted through apertures 391 and then apertures 393, the slightly angled positioning of conduit bender 396 (FIG. 49) helps secure conduit bender 396 within legs 389 of mobile storage device 310. Alternatively, conduit bender 396 can be inserted between upper housing and handle 319 such that a lower end of conduit bender 396 rests within a holding device, shown as container 394.

Figure 52:
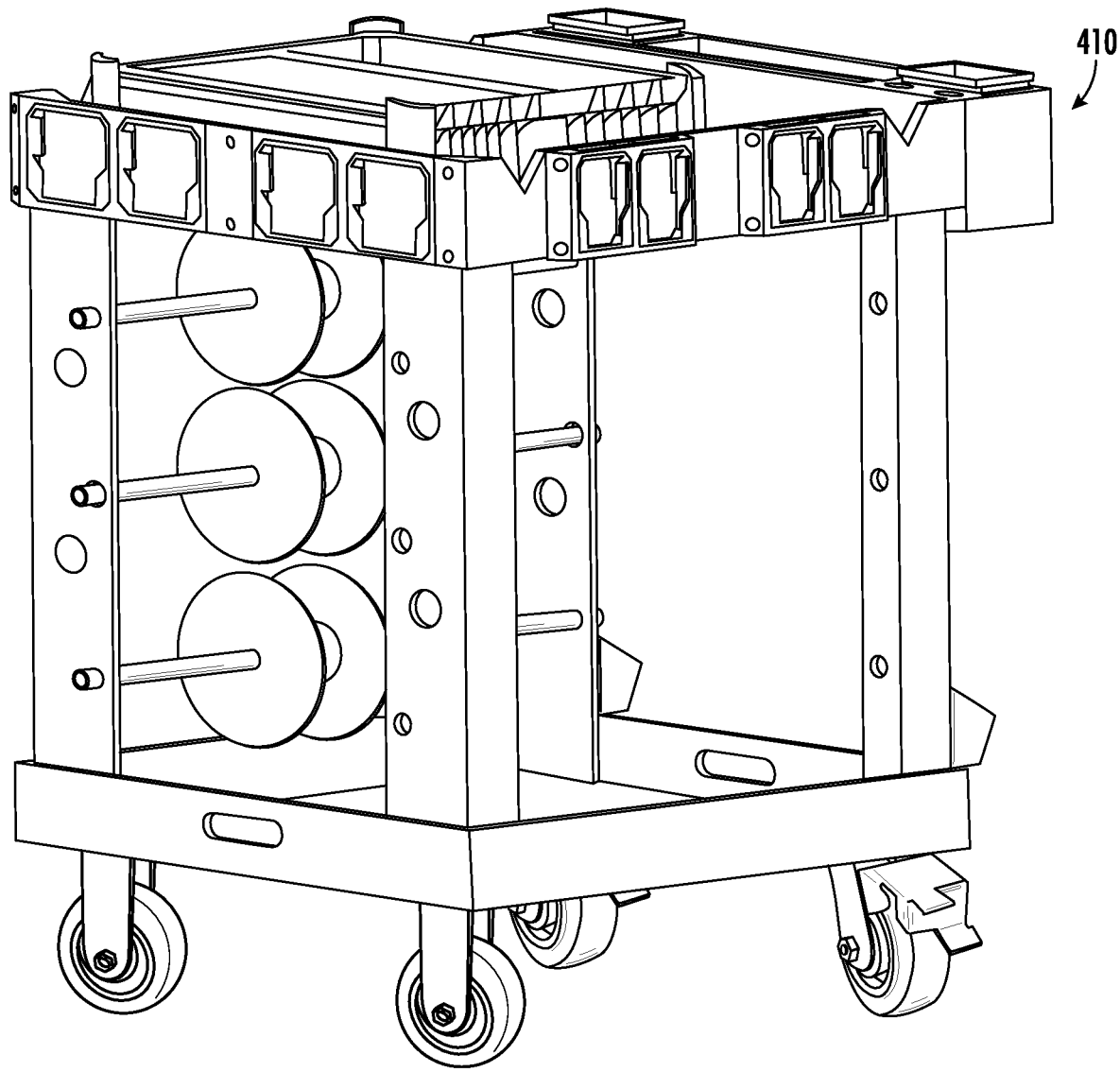
FIG. 52 is a perspective view of a mobile device, according to an exemplary embodiment.
Figure 53:
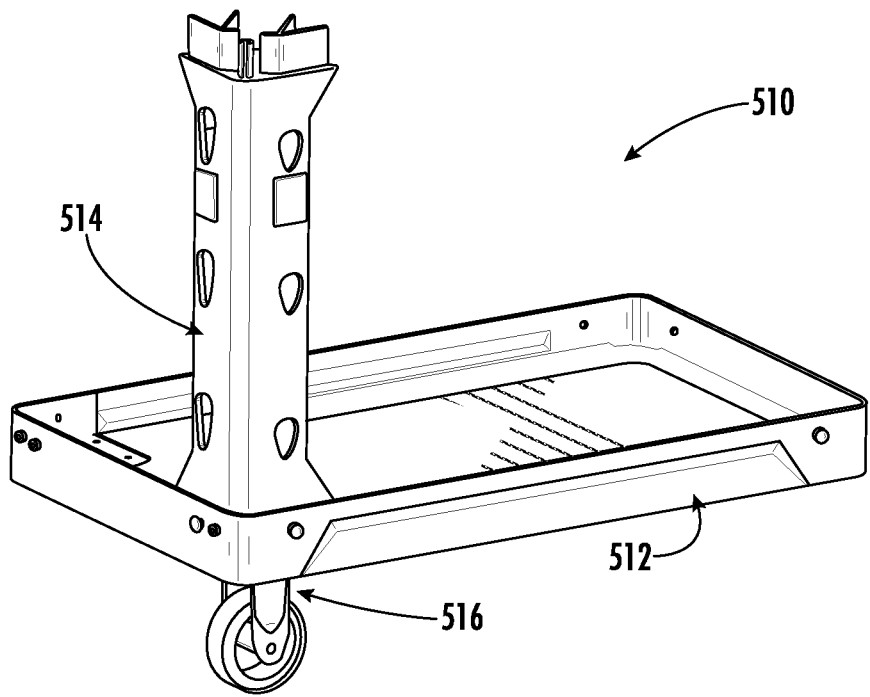
FIG. 53 is a perspective view of a portion of a mobile device, according to an exemplary embodiment.
Figure 54:
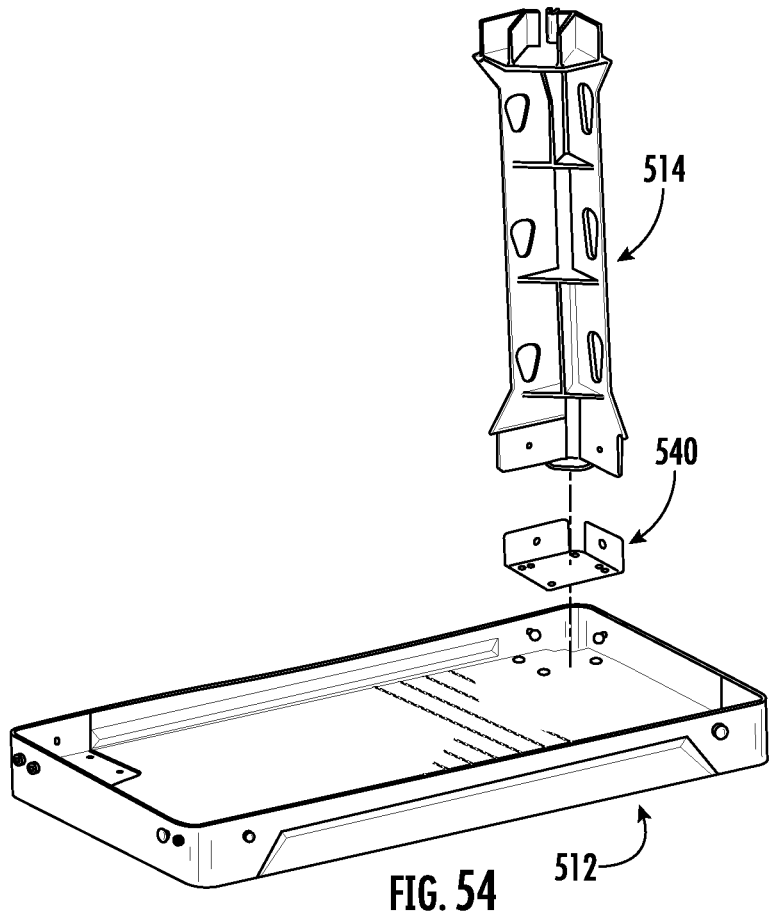
FIG. 54 is an exploded perspective view of the portion of the mobile device of FIG. 53, according to an exemplary embodiment.

Referring to FIG. 52, a container, unit and/or device, shown as a mobile storage device 410 is shown. Mobile storage device 410 is substantially the same as mobile storage device 310 except for the differences discussed herein. In a specific embodiment, mobile storage device 410 receives a plurality of cylinders through apertures of legs, such as three cylinders through a pair of legs.

Referring to FIGS. 53-58, a portion of a container, unit and/or device, shown as a portion of mobile storage device 510, is shown. Mobile storage device 510 is substantially the same as mobile storage device 310 except for the differences discussed herein. Although only one support leg 514 is shown coupled to housing 512 in FIG. 53, it will be appreciated that various embodiments of mobile storage device 510 each include one or more support legs 514, such as four support legs 514.

Mobile storage device 510 includes one or more wheel housings 516 coupled to a bottom of lower housing 512. One or more support legs 514 are coupled to a top of lower housing and extend upward away from wheel housings 516. A support structure, shown as bracket 540, strengthens the connections where support legs 514, wheel housing 516 and lower housing 512 are coupled.

Figure 55:
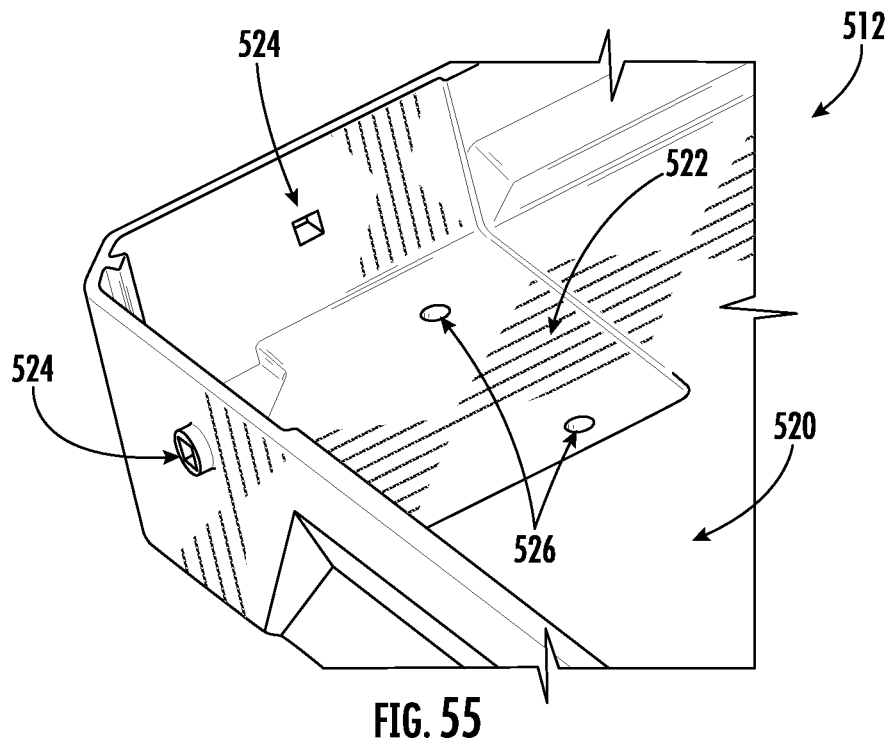
FIG. 55 is a detailed perspective view of the lower housing of the mobile device of FIG. 53, according to an exemplary embodiment.

Referring to FIG. 55, lower housing 512 receives bracket 540 in recess 522. Lower housing 512 includes one or more apertures 526 through which fasteners extend to couple to wheel housing 516. Lower housing 512 also includes one or more apertures 524 though which fasteners extend to couple to support leg 514.

Figure 56:
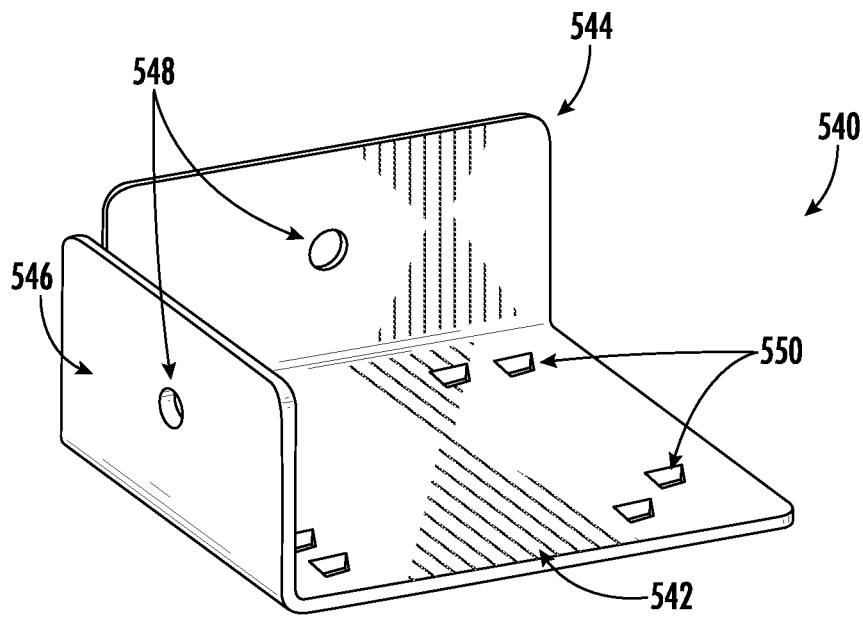
FIG. 56 is a perspective view of the bracket of the mobile device of FIG. 53, according to an exemplary embodiment.

Referring to FIG. 56, bracket 540 includes a lower panel 542 that defines one or more apertures 550. In a specific embodiment, fasteners extend through apertures 550 to couple bracket 540 to wheel housing 516. First side panel 544 and second side panel 546 extend upward from lower panel 542 and each define one or more apertures 548. In a specific embodiment, fasteners extend through apertures 548 to couple bracket 540 to support leg 514.

Figure 57:
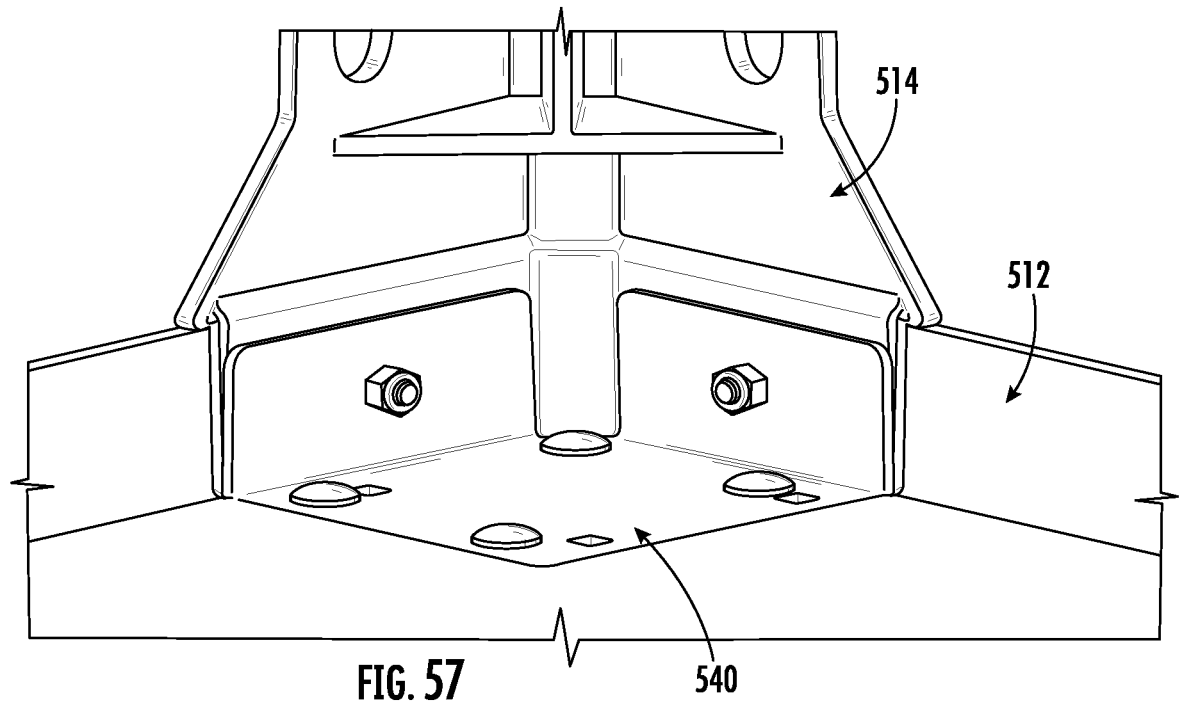
FIG. 57 is a detailed perspective view of the mobile device of FIG. 53, according to an exemplary embodiment.
Figure 58:
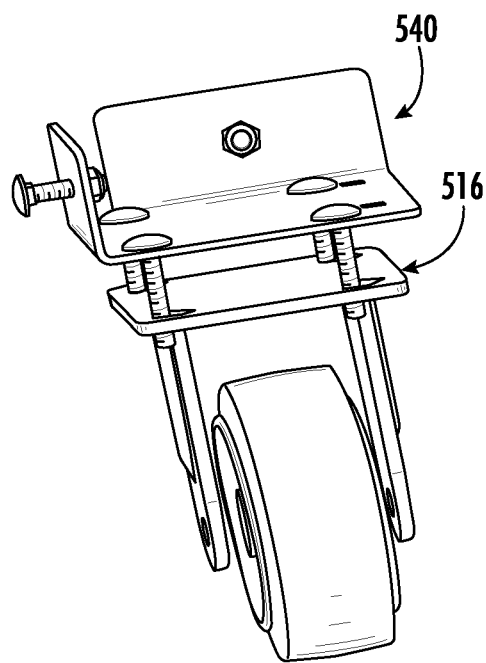
FIG. 58 is a detailed perspective view of the wheel housing and bracket of the mobile device of FIG. 53, according to an exemplary embodiment.
Figure 59:
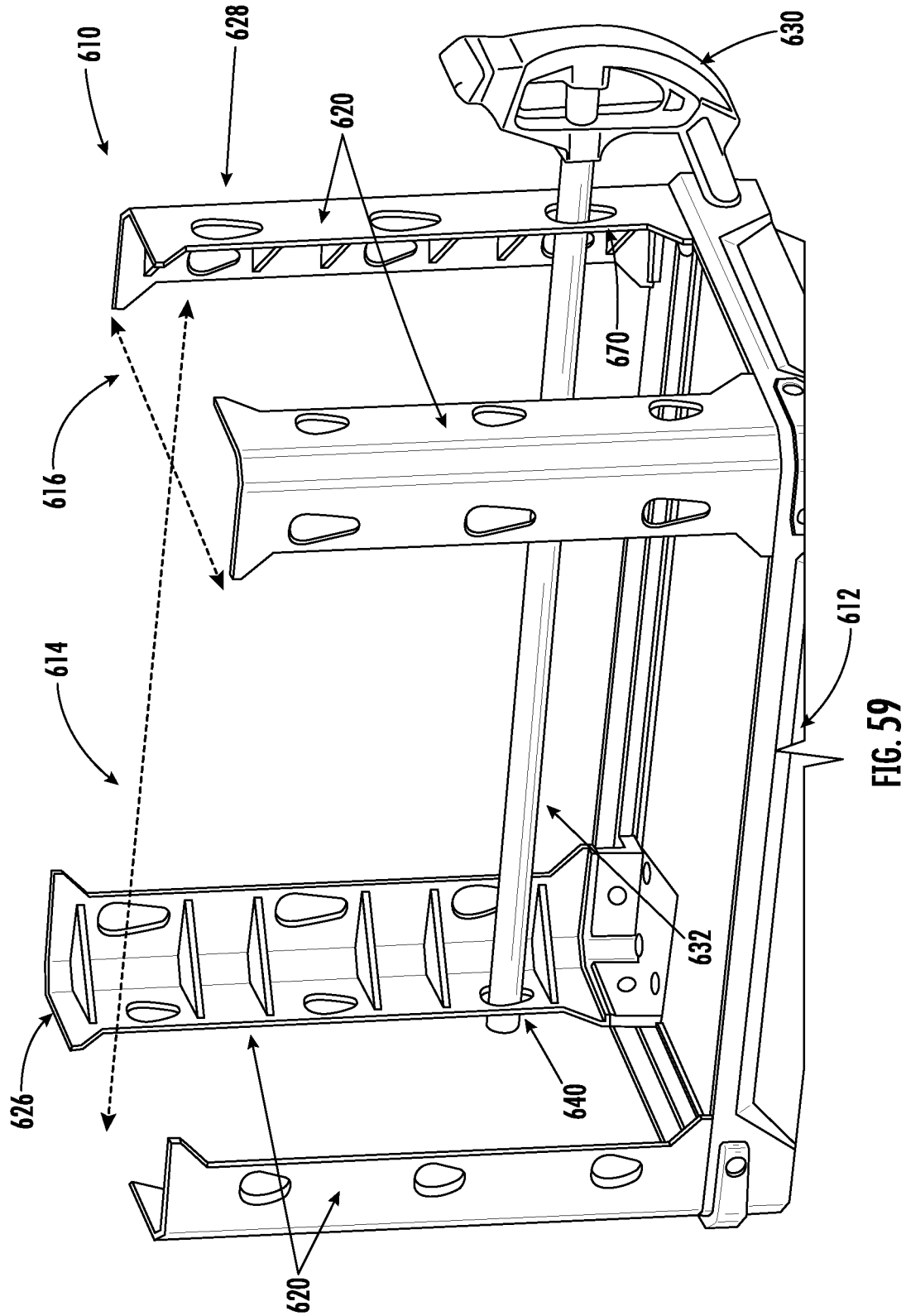
FIG. 59 is a perspective view of a mobile device, according to an exemplary embodiment.
Figure 60:
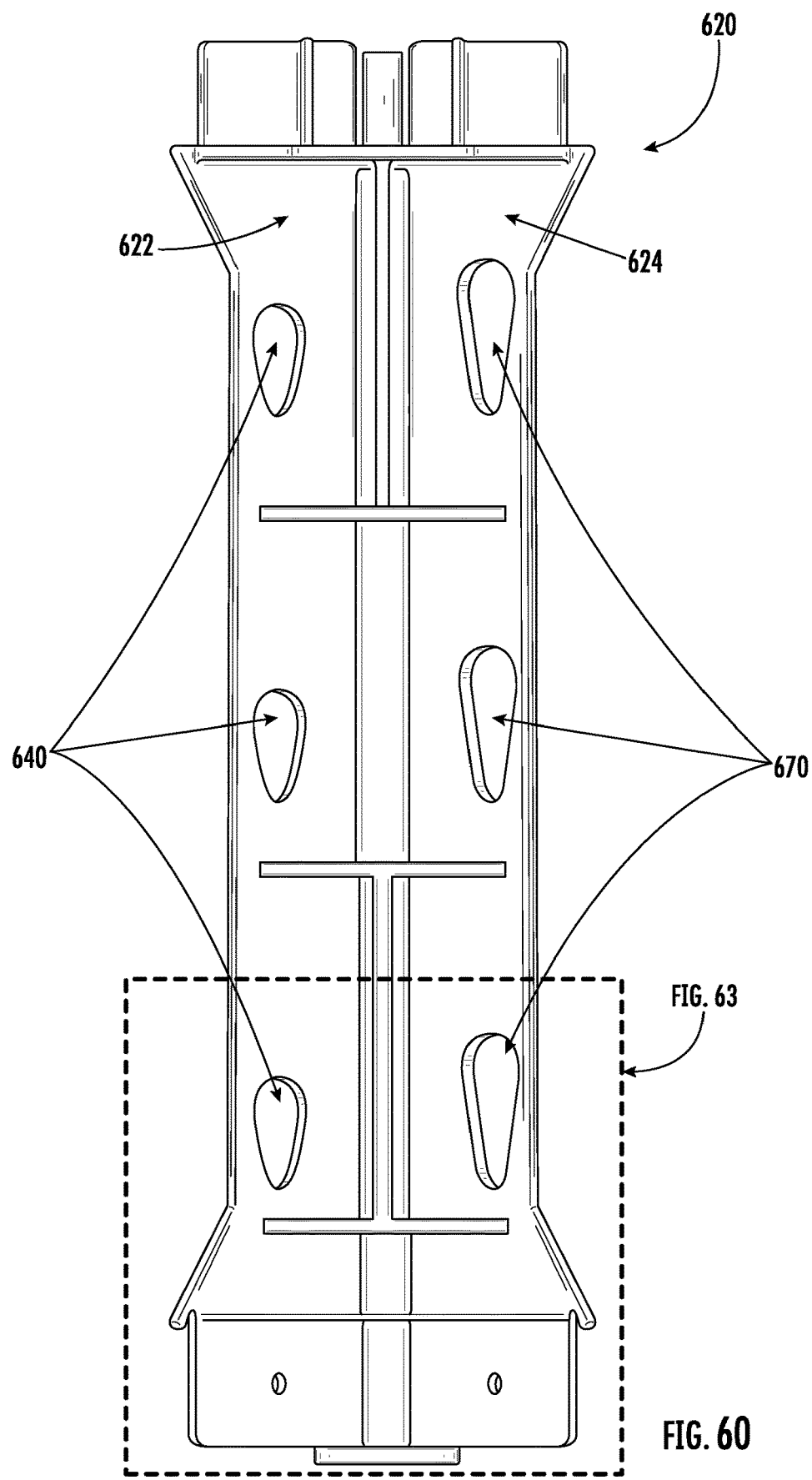
FIG. 60 is a side view of a support leg of the mobile device of FIG. 59, according to an exemplary embodiment.

Referring to FIGS. 57-58, support leg 514 is positioned between bracket 540 and lower housing 512. In a specific embodiment, support leg 514 is formed from a plastic material. Fasteners, shown as bolts, are extended through apertures to couple support leg 514, lower housing 512, bracket 540, and wheel housing 516. Applicant has observed that providing bracket 540 at one or more corners of lower housing 512 improves the strength of mobile storage device 510 and thereby reduces the likelihood of mobile storage device 510 structurally failing at that location.

Referring to FIGS. 59-63, a container, unit and/or device, shown as a mobile storage device 610, is shown. Mobile storage device 610 is substantially the same as mobile storage device 510 except for the differences discussed herein.

Mobile storage device 610 includes an arrangement of apertures that facilitate storing elongate tools, shown as conduit bender 630. For example, handle 632 of conduit bender 630 is extended through the apertures. Conduit bender 630 rests within the apertures at a slightly elevated angle so that gravity biases conduit bender 630 to remain within mobile storage device 610.

In various embodiments, first aperture 640 is defined by a first support leg, and second aperture 670 is defined by a second support leg. As will be described, first aperture 640 and second aperture 670 are arranged at equal or approximately equal positions (e.g., heights) with respect to each other. The varying rates of width changes for first aperture 640 and second aperture 670 result in elongate tools resting at different heights within first aperture 640 and second aperture 670. For example, referring to FIG. 59, handle 632 of conduit bender 630 rests at a lower position within first aperture 640 than within second aperture 670. As a result, gravity biases conduit bender 630 to remain within mobile storage device 610.

Mobile storage device 610 includes a lower housing 612. Lower housing 612 defines a primary longitudinal axis 614 along which lower housing extends, and a lateral axis 616 perpendicular to axis 614. One or more support legs 620 extend upward from lower housing 612, including a first support leg 626 and a second support leg 628. As will be observed in FIG. 59, support legs 620 are arranged around lower housing 612 such that first apertures 640 and second apertures 670 are aligned with each other along axis 614 or axis 616.

Referring to FIGS. 60-63, each support leg 620 includes a first wall 622 and a second wall 624. In a specific embodiment, first wall 622 and second wall 624 are perpendicular to each other. First wall 622 includes one or more first apertures 640, and second wall 624 includes second apertures 670. As will be described, first aperture 640 and second aperture 670 provide widths that vary at different rates, thereby allowing tool handles to rest at varying heights for a range of tool handle diameters.

Figure 62:
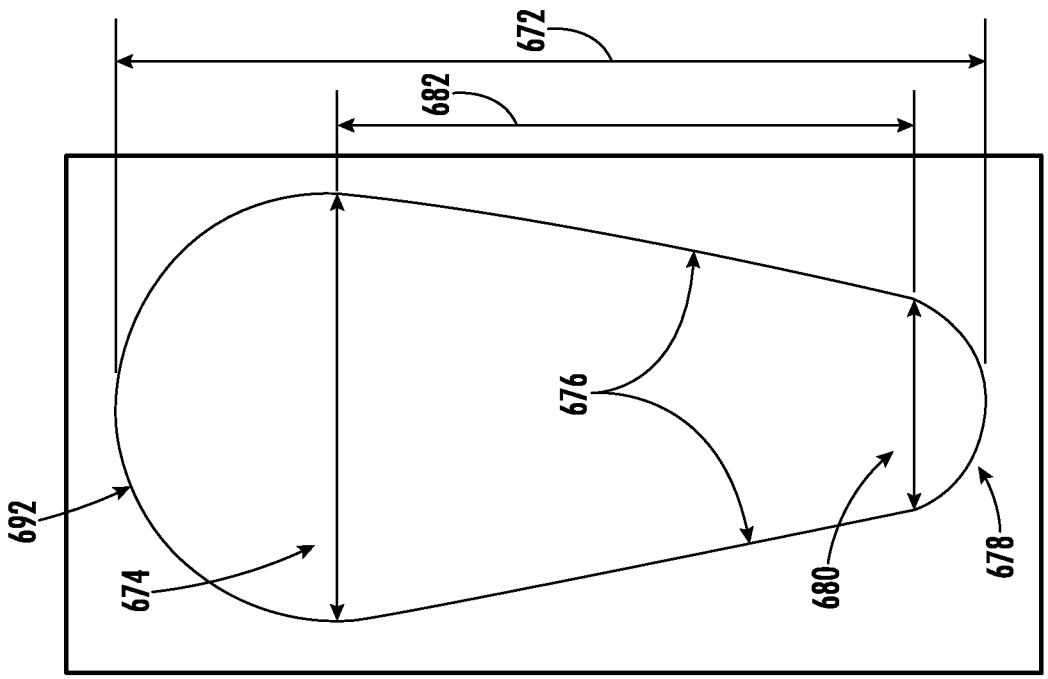
FIG. 62 is a front of a second aperture in the support leg of FIG. 60, according to an exemplary embodiment.
Figure 61:
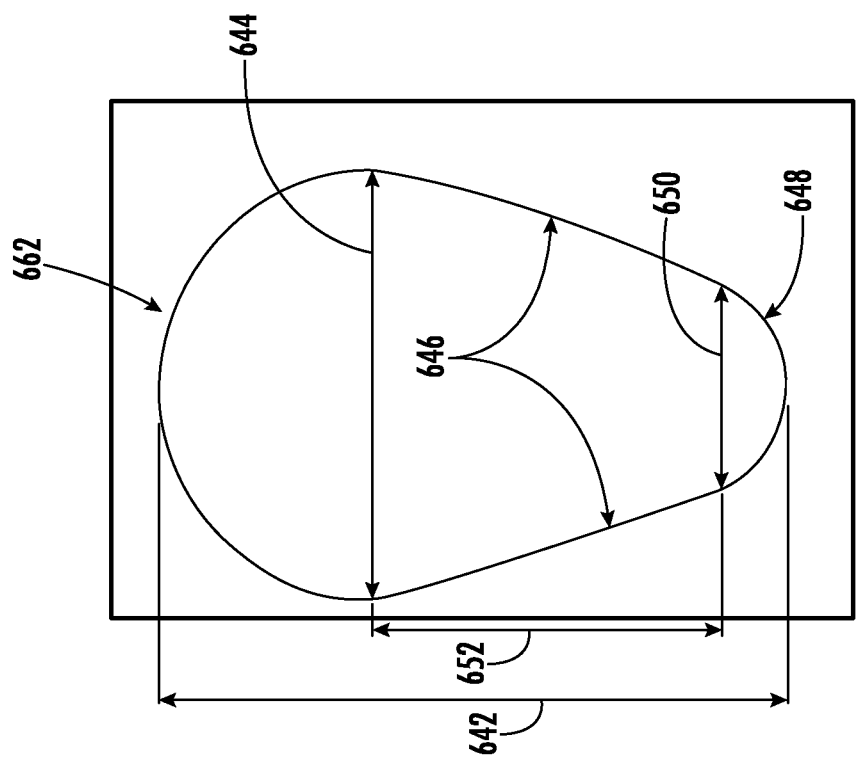
FIG. 61 is a front view of a first aperture in the support leg of FIG. 60, according to an exemplary embodiment.

Referring to FIGS. 61-62, side walls 646 of first aperture 640 define a width that varies from a maximum width 644 to shorter widths. First aperture 640 defines a minimum width 650 at the transition from linear side walls 646 to curved end 648 of first aperture 640. In a specific embodiment, end 648 of first aperture 640 defines a curve, such as a semi-circle.

Side walls 676 of second aperture 670 define a width that varies from a maximum width 674 to shorter widths. Second aperture 670 defines a minimum width 680 at the transition from linear side walls 676 to curved end 678 of second aperture 670. In a specific embodiment, end 678 of second aperture 670 defines a curve, such as a semi-circle.

First aperture 640 defines an upper end 662, a lower end 648, and side walls 646 extending between the upper 662 end and the lower end 648. First aperture 640 defines a first maximum width 644 at a transition from the upper end 662 to the side walls 646, and the first aperture 640 defines a first minimum width 650 at a transition from the lower end 648 to the side walls 646. The first aperture 640 defines a width that varies at a first rate from the first maximum width 644 to the first minimum width 650. In various embodiments, the upper end 662 and the lower end 648 of the first aperture 640 are arcuate-shaped.

The second aperture 670 is aligned with the first aperture 640 such that the first aperture 640 and the second aperture 670 are configured to contemporaneously receive an elongate support structure extending between the first aperture 640 and the second aperture 670. In various embodiments the first aperture 640 and the second aperture 670 are configured such that the elongate support structure is orientated at a non-zero angle relative to horizontal when the elongate support structure extends between the first aperture 640 and the second aperture 670, and in particular such that gravity biases the elongate support structure to remain within first aperture 640 and second aperture 670 (e.g., via gravity biasing the handle of the elongate support structure towards the apertures 640, 670).

Second aperture 670 defines an upper end 692, a lower end 678, and side walls 676 extending between the upper 692 end and the lower end 678. Second aperture 670 defines a first maximum width 674 at a transition from the upper end 692 to the side walls 676, and the second aperture 670 defines a first minimum width 680 at a transition from the lower end 678 to the side walls 676. The second aperture 670 defines a width that varies at a first rate from the first maximum width 674 to the first minimum width 680. In various embodiments, the upper end 692 and the lower end 678 of the second aperture 670 are arcuate-shaped.

The width of first aperture 640 varies at a first rate from a maximum width 644 to a minimum width 650 across length 652. The width of second aperture 670 varies at a second rate from a maximum width 674 to a minimum width 680 across length 682, and the second rate is less than the first rate. Stated another way, first aperture 640 gets narrower quicker than second aperture 670.

In a specific embodiment, the first rate and the second rate are each the change in width with respect to the change in height, and a ratio of the first rate to the second rate is between 2.5:1 and 1.1:1, and more specifically is between 2.0:1 and 1.3:1, and more specifically is 1.6:1. In a specific embodiment, total length 642 of first aperture 640, as measured in the vertical direction, is less than total length 672 of second aperture 670.

Figure 63:
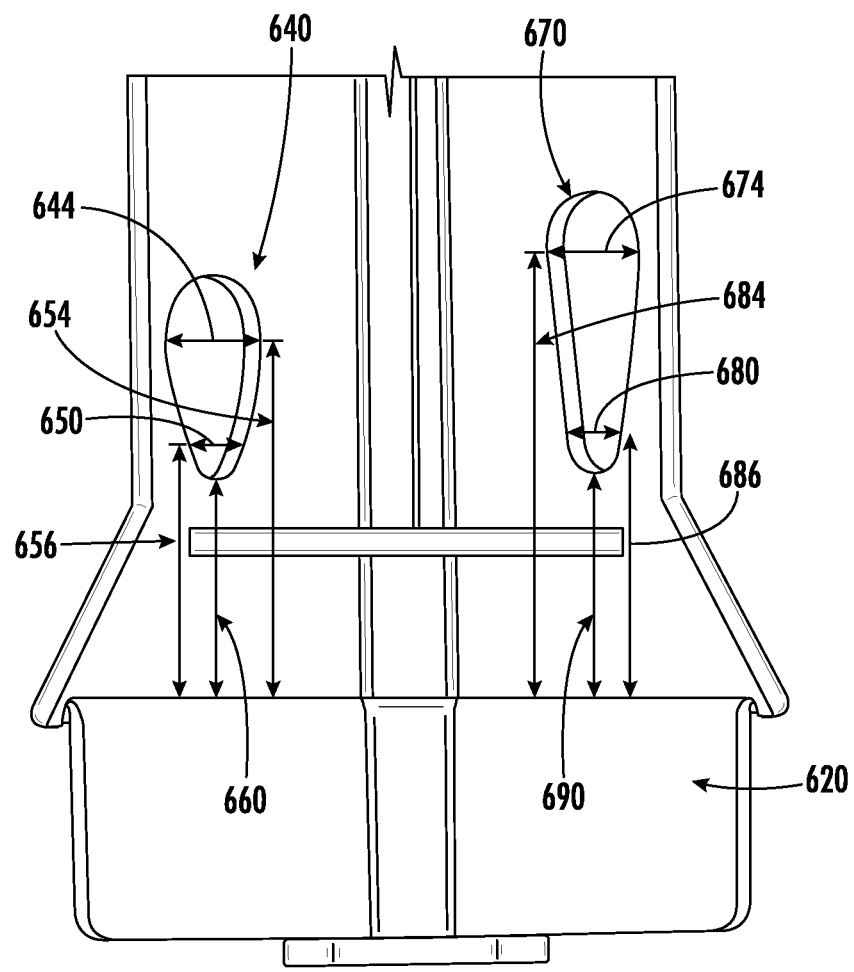
FIG. 63 is a detailed view of the support leg of FIG. 60, according to an exemplary embodiment.

Referring to FIG. 63, first aperture 640 defines a first height 654 of maximum width 644 and a second height 656 of minimum width 650. Second aperture 670 defines a first height 684 of maximum width 674 and a second height 686 of minimum width 680. A bottom of first aperture 640 is height 660 above a given location on support leg 620, and a bottom of second aperture 670 is height 690 above the same location on support leg 620. In a specific embodiment, height 660 is equal to height 690 because the bottoms of first aperture 640 and second aperture 670 are at equal heights. In a specific embodiment, height 656 of minimum width 650 of first aperture 640 is equal to or approximately equal to height 686 of minimum width 680 of second aperture 670.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

What is claimed is:

1. A mobile tool support device configured to move and support tools and equipment on a worksite, the mobile tool support device comprising:
   a lower housing;
   a plurality of wheels coupled to the lower housing;
   a plurality of legs extending upward from the lower housing;
   an upper housing coupled to the plurality of legs above the lower housing;
   a handle coupled to the upper housing, the handle configured to facilitate a user moving the mobile tool support device;
   a coupling interface coupled to a periphery of the upper housing, the coupling interface comprising a first rib and a second rib extending along opposing sides of the coupling interface, the first rib and the second rib offset from the upper housing, the coupling interface configured to couple with a second coupling interface, wherein the coupling interface is configured to detachably engage with a tool storage modular unit such that the tool storage modular unit is supported by the upper housing; and
   a first leg of the plurality of legs comprising a recess that extends inwardly in a first direction from an outer surface of the first leg, the recess configured to receive an axle and permit the axle to rotate, the recess including an upper portion that extends inwardly in the first direction from the outer surface of the first leg, the recess including a holding area extending downwardly from the upper portion, the holding area configured to receive the axle and permit the axle to rotate within the holding area.

2. The mobile tool support device of claim 1, the first leg including a projection that extends in the first direction into the recess above the holding area.

3. The mobile tool support device of claim 1, wherein the handle is detachably coupled to the upper housing.

4. The mobile tool support device of claim 1, wherein the handle is coupled to the upper housing via the coupling interface.

5. A mobile tool support device configured to move and support tools and equipment on a worksite, the mobile tool support device comprising:
   a lower housing;
   a plurality of wheels coupled to the lower housing;
   a plurality of legs extending upward from the lower housing;
   an upper housing coupled to the plurality of legs above the lower housing;
   a handle coupled to the upper housing, the handle configured to facilitate a user moving the mobile tool support device;
   a coupling interface coupled to a periphery of the upper housing, the coupling interface comprising a first rib and a second rib extending along opposing sides of the coupling interface, the first rib and the second rib offset from the upper housing, the coupling interface configured to couple with a second coupling interface, wherein the coupling interface is configured to detachably engage with a tool storage modular unit such that the tool storage modular unit is supported by the upper housing; and
   a kickstand pivotally coupled to the mobile tool support device, the kickstand actuates between a locked position and an unlocked position, wherein the kickstand interfaces with a floor that the mobile tool support device is positioned on when the kickstand is in the locked position.

6. A mobile tool support device configured to move and support tools and equipment on a worksite, the mobile tool support device comprising:
   a lower housing;
   a plurality of wheels coupled the lower housing;
   a plurality of legs extending upward from the lower housing;
   an upper housing coupled to the plurality of legs;
   a handle coupled to the upper housing, the handle configured to facilitate a user moving the mobile tool support device; and
   a first coupling element coupled to a first leg of the plurality of legs, the first coupling element configured to receive an elongate support structure, the first coupling element comprising:
      a lower wall;
      a rear wall extending upward from the lower wall away from the lower housing;
      a primary channel extending through the first coupling element along a first axis, wherein the primary channel is aligned with at least a portion of the rear wall thereby preventing the elongate support structure from extending past the rear wall when transiting the primary channel along the first axis;
      an aperture within the rear wall; and
      an angled channel extending through the first coupling element along a second axis, the second axis defining an angle of at least 30 degrees with respect to the first axis, wherein the angled channel is aligned with the aperture thereby permitting the elongate support structure to extend past the rear wall when transiting the angled channel along the second axis, wherein the aperture is in fluid communication with the primary channel via the angled channel.

7. The mobile tool support device of claim 6, wherein the angle is less than 60 degrees.

8. The mobile tool support device of claim 6, the first coupling element comprising a protrusion extending upward from the lower wall between the primary channel and the angled channel.

9. The mobile tool support device of claim 6, the angled channel extending horizontally relative to a floor that the mobile tool support device is positioned on.

10. The mobile tool support device of claim 6, the primary channel extending vertically from the lower wall.

11. The mobile tool support device of claim 6, further comprising:
    a coupling interface coupled to a periphery of the upper housing, the coupling interface comprising a first rib and a second rib extending along opposing sides of the coupling interface, the first rib and the second rib offset from the upper housing, the coupling interface configured to couple with a second coupling interface, wherein the coupling interface is configured to detachably engage with a tool storage modular unit such that the tool storage modular unit is supported by the upper housing.

12. The mobile tool support device of claim 6, the plurality of legs comprising a second leg distinct from the first leg, the mobile tool support device comprising a second coupling element coupled to the second leg, the second coupling element configured to receive the elongate support structure when the elongate support structure is extending through the primary channel along the first axis.

13. A mobile tool support device configured to move and support tools and equipment on a worksite, the mobile tool support device comprising:
   a lower housing;
   a plurality of wheel housings coupled the lower housing;
   a first support leg coupled to the lower housing and extending upward from the lower housing;
   a second support leg coupled to the lower housing and extending upward from the lower housing;
   an upper housing coupled to the first support leg and the second support leg;
   a handle coupled to the upper housing, the handle configured to facilitate a user moving the mobile tool support device;
   a first aperture defined by the first support leg, the first aperture defining an upper end, a lower end, and side walls extending between the upper end and the lower end, the first aperture defining a first maximum width at a transition from the upper end to the side walls, the first aperture defining a first minimum width at a transition from the lower end to the side walls, the first aperture defining a width that varies at a first rate from the first maximum width to the first minimum width; and
   a second aperture defined by the second support leg, wherein the second aperture is aligned with the first aperture such that the first aperture and the second aperture are configured to contemporaneously receive an elongate support structure extending between the first aperture and the second aperture, the second aperture defining an upper end, a lower end, and side walls extending between the upper end and the lower end, the second aperture defining a second maximum width at a transition from the upper end to the side walls, and the second aperture defining a second minimum width at a transition from the lower end to the side walls, the second aperture defining a width that varies at a second rate from the second maximum width to the second minimum width, wherein the second rate is less than the first rate.

14. The mobile tool support device of claim 13, wherein the first aperture and the second aperture are configured such that the elongate support structure is orientated at a non-zero angle relative to horizontal when the elongate support structure extends between the first aperture and the second aperture.

15. The mobile tool support device of claim 13, wherein the first aperture and the second aperture are configured such that gravity biases the elongate support structure to remain within the first aperture and the second aperture.

16. The mobile tool support device of claim 13, wherein the upper end and the lower end of the first aperture are arcuate-shaped, and wherein the upper end and the lower end of the second aperture are arcuate-shaped.

17. The mobile tool support device of claim 13, wherein a ratio of the first rate to the second rate is between 2.5:1 and 1.1:1.

18. The mobile tool support device of claim 13, wherein a first height of the first minimum width is equal to a second height of the second minimum width.

\* \* \* \* \*